United States Patent [19]

Terrell et al.

[11] Patent Number: 5,003,807
[45] Date of Patent: Apr. 2, 1991

[54] PRESS ASSEMBLY AND METHOD OF OPERATION

[75] Inventors: John Terrell, Moreland Hills; Paul M. Kadis, Chardon; Leonard L. Hiney, Ravenna; Susan E. Pfaff, Seven Hills, all of Ohio

[73] Assignee: Teledyne Industries, Inc., Cleveland, Ohio

[21] Appl. No.: 429,200

[22] Filed: Oct. 30, 1989

[51] Int. Cl.⁵ .............................................. B21D 24/08
[52] U.S. Cl. ....................................... 72/351; 267/119
[58] Field of Search ............................. 72/351, 453.13; 267/119

[56] References Cited

U.S. PATENT DOCUMENTS

| | | |
|---|---|---|
| 487,271 | 12/1892 | Hodgon . |
| 1,884,700 | 10/1932 | Hothersall . |
| 2,217,172 | 10/1940 | Laussucq . |
| 3,296,850 | 1/1967 | Fiore . |
| 3,456,478 | 7/1969 | Alexander . |
| 3,488,045 | 1/1970 | Balunas, Jr. et al. ............ 267/119 |
| 3,636,748 | 1/1972 | Hall et al. . |
| 3,636,749 | 1/1972 | Heiser . |
| 4,499,750 | 2/1985 | Gerber et al. . |
| 4,635,466 | 1/1987 | Seki et al. ........................ 72/351 |
| 4,754,955 | 7/1988 | Otsuka et al. ................. 72/453.13 |
| 4,765,227 | 8/1988 | Balazs et al. . |
| 4,821,552 | 4/1989 | Baur et al. . |

Primary Examiner—Lowell A. Larson
Attorney, Agent, or Firm—Tarolli, Sundheim & Covell

[57] ABSTRACT

A press assembly is operable from the open condition to a closed condition to deform a workpiece. The press assembly is the operable from the closed condition to an open condition to facilitate removal of the deformed workpiece from the press assembly. During operation of the press assembly, the workpiece is held by upper and lower draw rings or members which apply pressure to opposite sides of the workpiece. A cushion assembly is operable to provide a yieldable force opposing movement of the draw rings. As the press is operated from the open condition to the closed condition, the lower draw ring is accelerated while the upper draw ring is spaced from the lower draw ring. This reduces shock loading on the press when the upper draw ring and workpiece subsequently impact against the lower draw ring to grip the workpiece. To effect acceleration of the lower draw ring, force is transmitted from the upper draw ring to the cushion assembly to retract the cushion assembly prior to impacting of the upper draw ring and workpiece against the lower draw ring. During operation of the press assembly to the open condition, the lower draw ring is decelerated relative to the upper draw ring before the lower draw ring reaches its initial or open press condition.

193 Claims, 6 Drawing Sheets

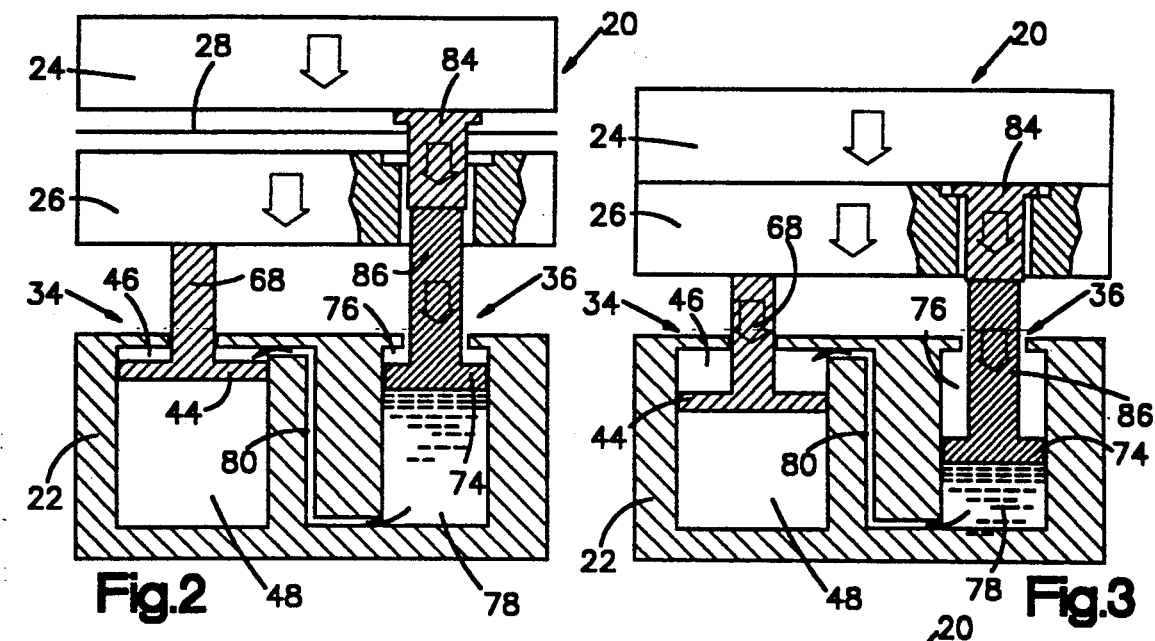
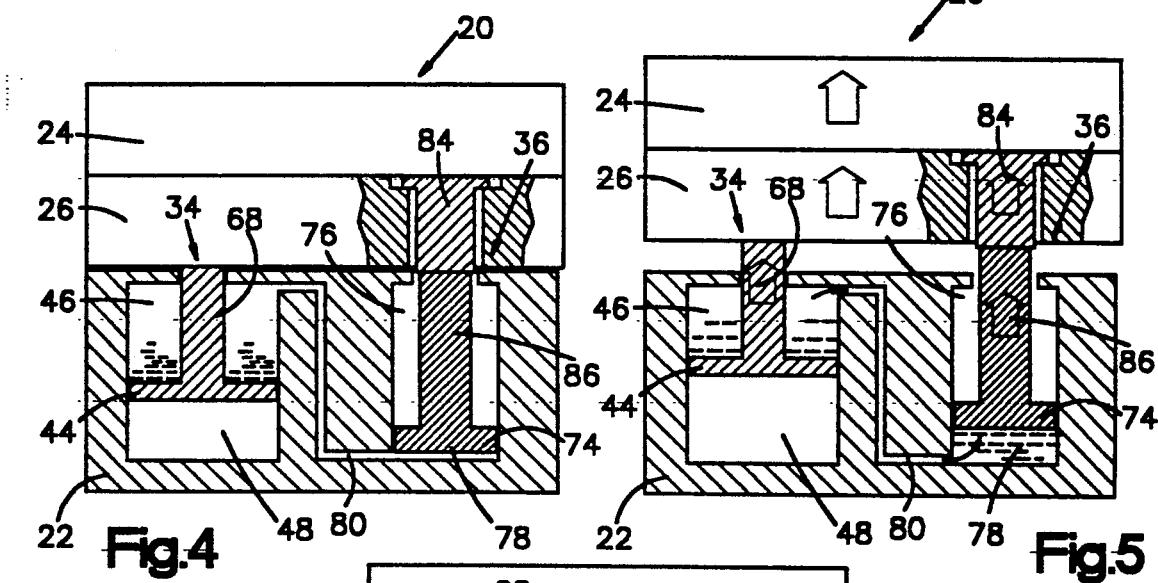
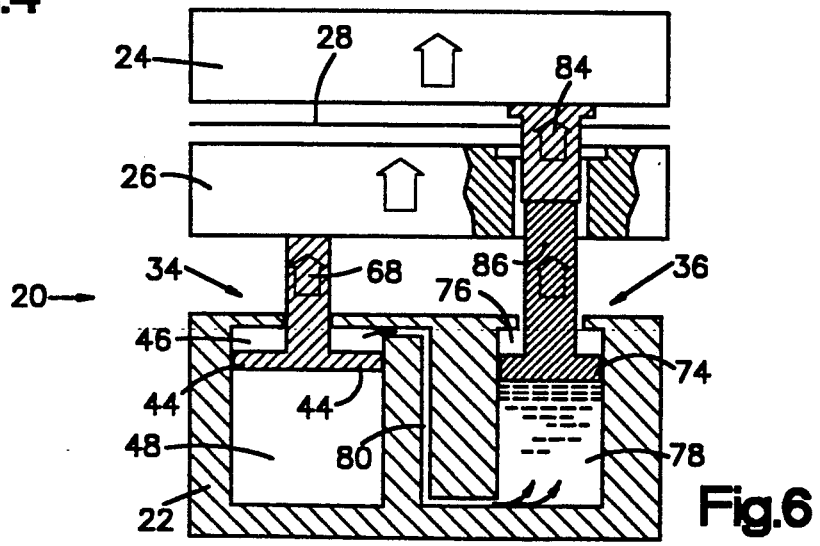

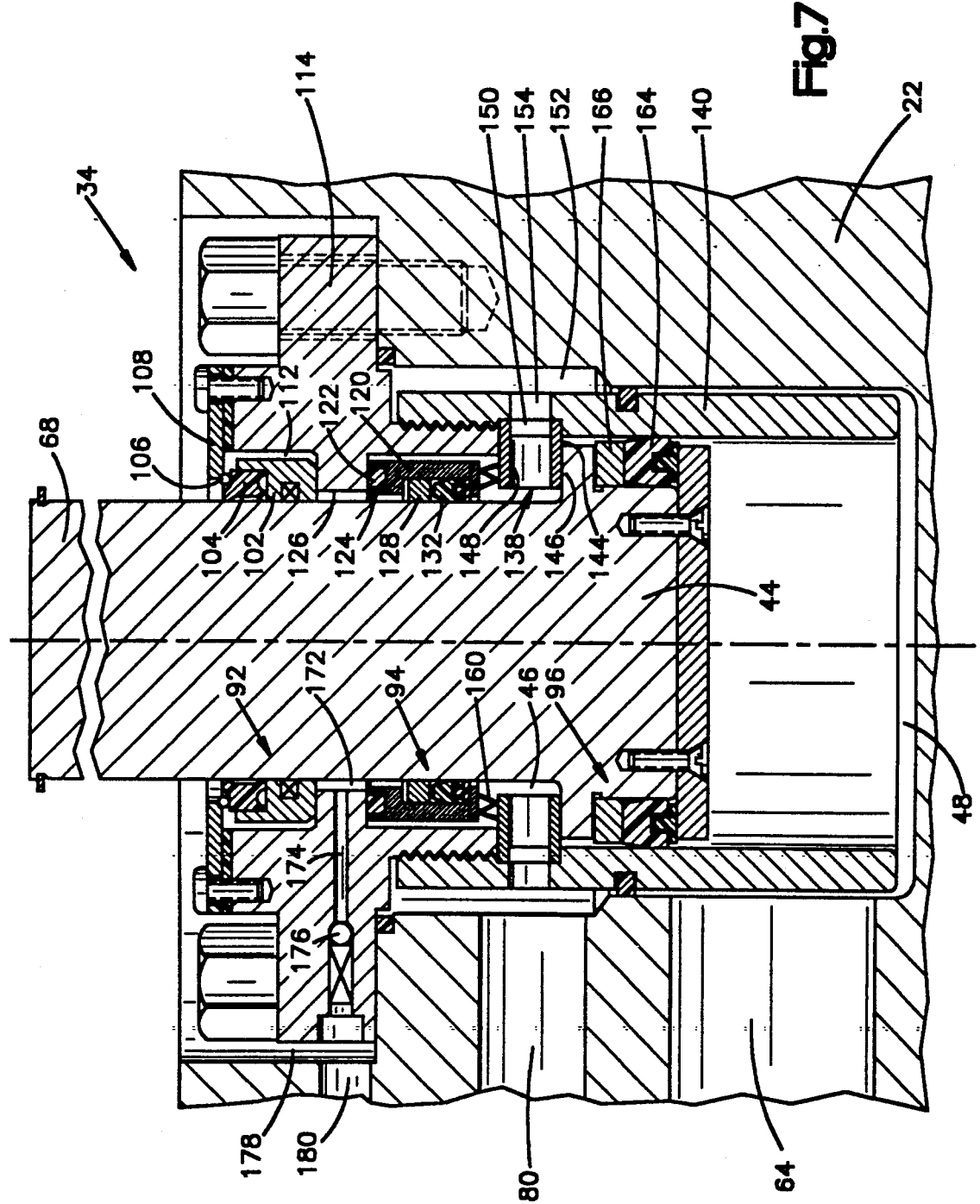

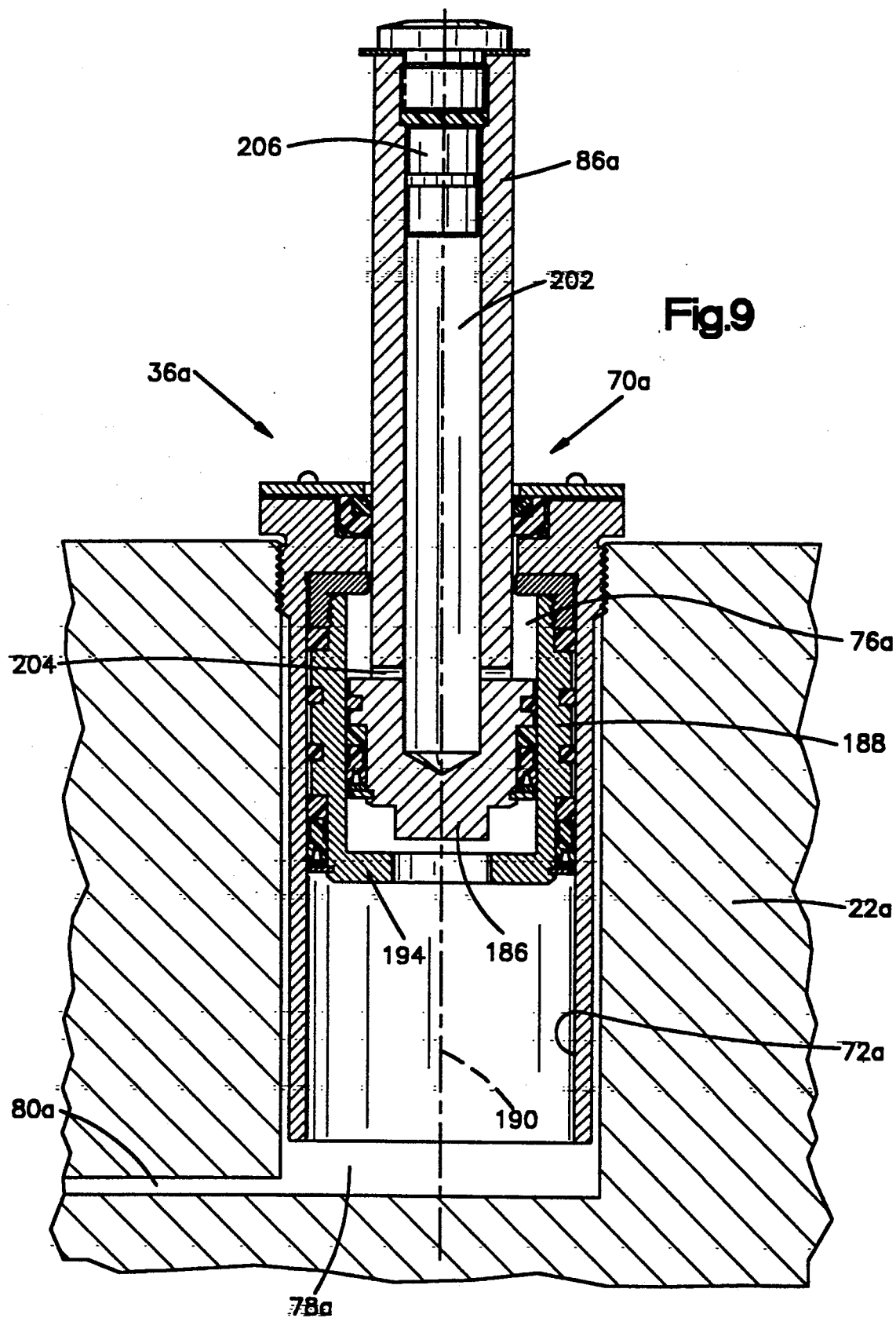

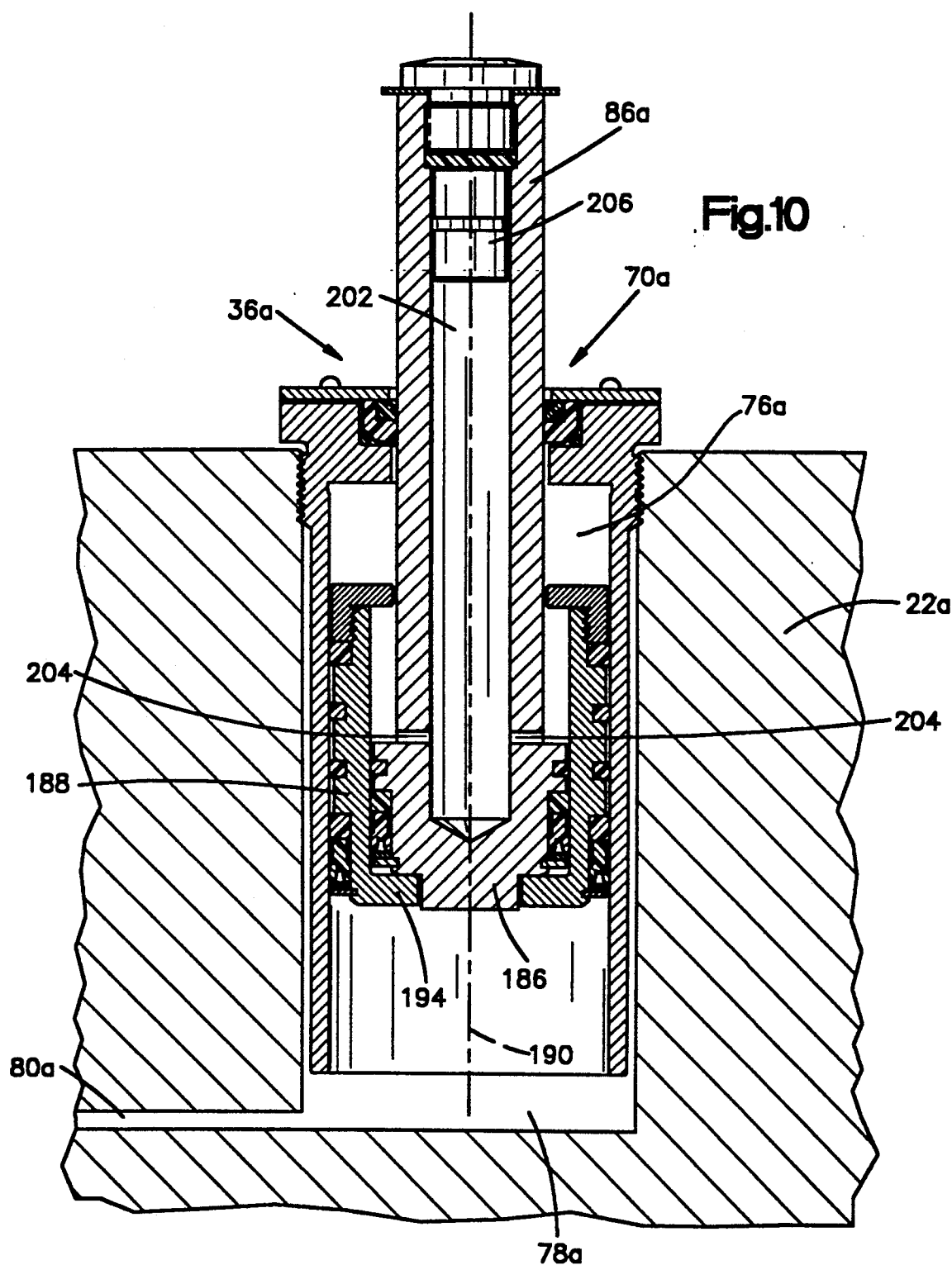

PRESS ASSEMBLY AND METHOD OF OPERATION

BACKGROUND OF THE INVENTION

The present invention relates to a press assembly and method of operating it to deform a workpiece.

There are many known press assemblies which are used to deform workpieces. these known press assemblies may have an upper die which cooperates with a lower die to deform the workpiece. Workpiece holders may be associated with the upper and/or lower dies. Press assemblies having known constructions are disclosed in U.S. Pat. Nos. 1,884,700; 2,217,172; 3,296,850; 3,456,478; 3,636,748; and 3,636,749.

Stretch drawing is performed during the operation of some known presses. During stretch drawing, the edges of a sheet metal workpiece are firmly gripped between upper and lower draw rings. After the workpiece has been gripped, an upper die is closed against a lower die to deform the workpiece. Under certain circumstances, a stretch draw operation is preferred because it reduces the total amount of metal used to form an article, tends to improve the quality of the article, and facilitates maintaining uniform quality during production of a series of articles.

Although stretch draw operations are preferred during the forming of certain articles, there are problems which may be encountered during a stretch draw operation. These problems relate to an extremely high noise level and to damage which occurs due to shock loading. Shock loading has been so bad that, in the past, a crank shaft on a large press assembly has broken under the influence of the shock loading. In addition, there is a tendency for cushion assemblies and other components of the press assembly to loosen due to the severe vibrations to which the press assembly is subjected. It is believed that the severe shock loading and vibrations during a stretch draw operation will substantially decrease the total operating life of a press assembly.

When a press assembly is operated from an open condition to a closed condition during a stretch draw operation, an upper draw ring and workpiece are impacted against a lower draw ring. When this occurs, extremely large shock loading forces may be present. Thus, the lower draw ring may have a weight of between 1,400 and 70,000 pounds. When an upper draw ring impacts against a stationary lower draw ring at a speed of approximately 100 feet per minute, the inertia of the lower draw ring resists acceleration. Acceleration of the lower draw ring is also resisted by upwardly directed biasing forces applied against the lower draw ring by cushion assemblies.

When the press assembly is operated from a closed condition to an open condition, the upper and lower draw ring move upwardly together. When the lower draw rings reaches the end of its upward stroke, it is moving upwardly at a substantial speed, for example, at a speed of approximately 100 feet per minute. Due to the inertia of the lower draw ring, it may separate from its cushion assemblies by a distance of approximately one inch. The lower draw ring then falls back on the cushion assemblies which then cause the draw ring to rebound. Downward falling and rebounding of the draw ring is repeated, with decreasing strokes, as the press continues to open. The rebounding of the lower draw ring on the cushion assemblies vibrates the cushion assemblies in such a manner that they tend to become loose and leak. The vibrating load, to which the lower draw ring subjects the cushion assemblies, can result in substantial wear of components of the cushion assemblies.

In an effort to avoid shock loading of components of a press assembly during operation of the press assembly from an open condition to a closed condition, U.S. Pat. No. 4,499,750 suggests that a lower draw ring or sheet metal holder be accelerated in a downward direction before an upper draw ring or drawing die comes into contact with the workpiece. Downward acceleration of the lower draw ring is effected by actuating a control valve in timed relationship with opening of the press. Actuation of the control valve exposes a piston to fluid pressure to move the lower draw ring downwardly against the influence of a die cushion piston.

SUMMARY OF THE INVENTION

The present invention relates to a press assembly having upper and lower draw rings or members to apply pressure to opposite sides of a workpiece during operation of the press assembly. When the press assembly is operated from an open condition to a closed condition, the upper draw ring is moved downwardly towards the lower draw ring. Before the upper draw ring impacts against the lower ring, the lower draw ring is accelerated in a downward direction by transmitting force from the upper draw ring to a cushion assembly. Force transmitted from the upper draw ring to the cushion assembly effects operation of the cushion assembly toward a retracted condition so that the lower ring is moving downwardly when the upper draw ring impacts with the lower draw ring. Since the lower draw ring is moving downwardly when it is impacted by the upper draw ring, shock loading is reduced.

When the press assembly is operated from a closed condition to an open condition, operation of the cushion assembly from a retracted condition is opposed to effect deceleration of the lower draw ring before it reaches its initial position. Thus, the speed of the lower draw ring is reduced before it is stopped. This minimizes rebounding of the lower draw ring vibration of the press assembly.

Accordingly, it is an object of this invention to minimize operating loads on components of a press assembly by accelerating a lower draw ring before an upper draw ring and workpiece are impacted against the lower draw ring during closing of the press assembly.

Another object of this invention is to minimize operating loads on components of a press assembly by decelerating a draw ring before it is stopped during opening of the press assembly.

Another object of this invention is to provide a new and improved press assembly and method of operation in which forces are transmitted from an upper draw ring to a cushion assembly to initiate operation of the cushion assembly toward a retracted condition and acceleration of the lower draw ring during closing of the press assembly.

Another object of this invention is to provide a new and improved press assembly and method of operation wherein operation of a cushion assembly to an extended condition is retarded to reduce the speed of a draw ring during opening of the press assembly.

BRIEF DESCRIPTION OF THE DRAWINGS

The foregoing and other objects and features of the present invention will become more apparent upon consideration of the following description taken in connection with the accompanying drawings wherein:

FIG. 2 is a simplified schematic illustration, similar to FIG. 1, illustrating the manner in which a control assembly effects retraction of a cushion assembly and downward movement of a lower draw ring while an upper draw ring is moving toward the lower draw ring as the press assembly closes;

FIG. 3 is a schematic illustration, generally similar to FIG. 2, depicting the relationship between the components of the press assembly when the upper draw ring and the workpiece have impacted against the downwardly moving lower draw ring as the press assembly closes;

FIG. 4 is a schematic illustration, generally similar to FIG. 3, illustrating the relationship between components of the press assembly when the press assembly is in a closed condition;

FIG. 5 is a schematic illustration, generally similar to FIG. 4, illustrating the relationship between components of the press assembly after the upper and lower draw rings have moved upwardly from the closed positions of FIG. 4 as the press assembly opens;

FIG. 6 is a schematic illustration, generally similar to FIG. 5, illustrating the relationship between the components of the press assembly during upward movement of the lower draw ring, at a lower speed than the upper draw ring, shortly before stopping of upward movement of the lower draw ring as the press assembly opens;

FIG. 7 is an enlarged sectional view illustrating the construction of a cushion assembly used in the press assembly of FIG. 1-6;

FIG. 9 is a sectional view of the piston cylinder assembly of FIG. 8 with the inner piston partially retracted and the outer piston at the upper end of stroke postion; and FIG. 10 is a sectional view of the piston cylinder assembly of FIGS. 8 and 9 with both the inner and outer pistons partially retracted.

DESCRIPTION OF SPECIFIC PREFERRED EMBODIMENTS OF THE INVENTION

Press Assembly-General Description

Figure 1:
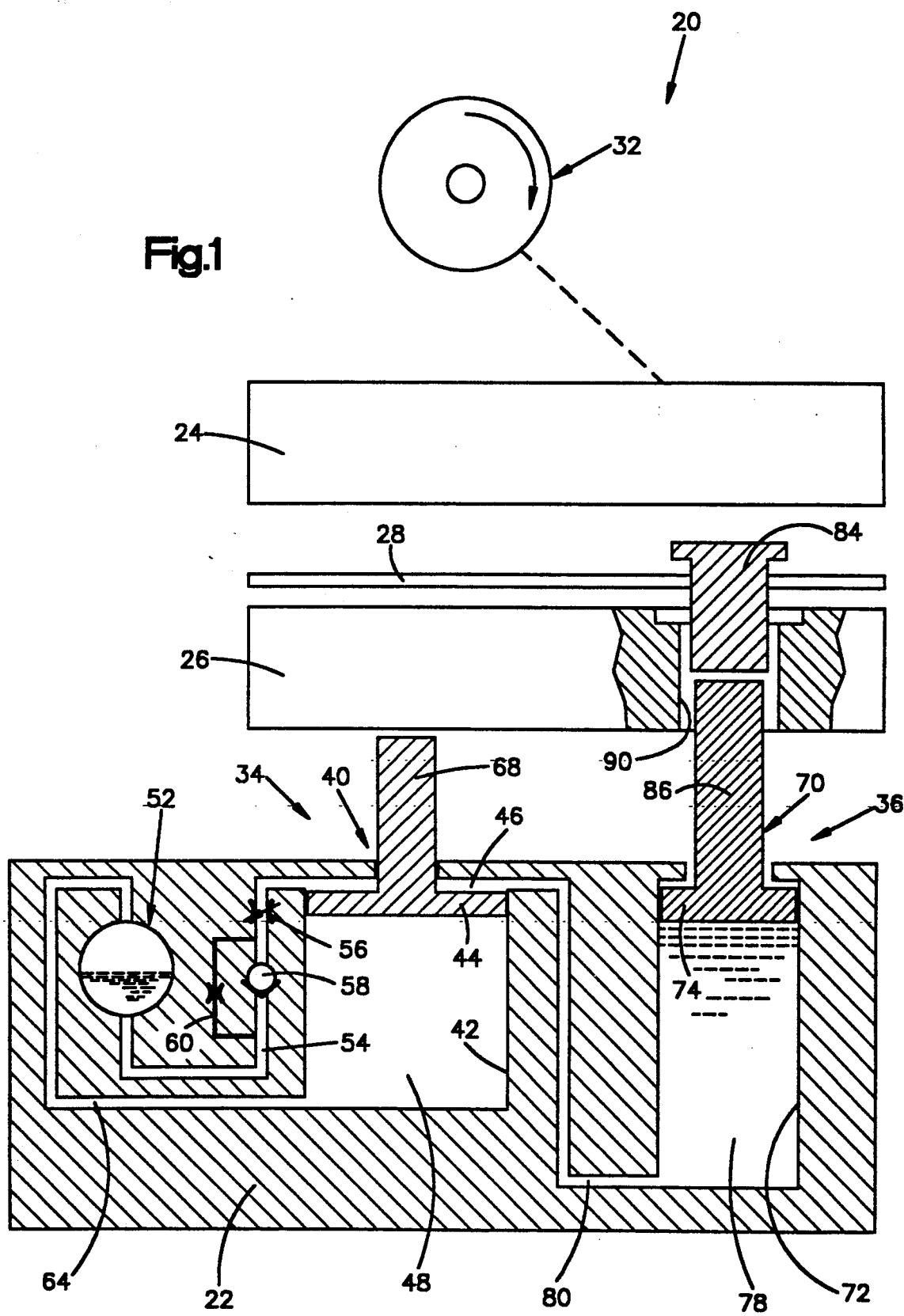
FIG. 1 is a schematic illustration of a press assembly which is constructed and operated in accordance with the present invention, the press assembly being shown in an open condition.

An improved press assembly 20, which is constructed and operated in accordance with the present invention, is illustrated schematically in FIG. 1. The press assembly 20 includes a stationary base 22. An upper draw ring or member 24 cooperates with a movable lower draw ring or member 26 during operation of the press assembly to deform a sheet metal workpiece 28. During operation of the press assembly 20, the upper and lower draw ring 24 and 26 are operable to apply pressure to opposite sides of the sheet metal workpiece 28 to firmly grip the workpiece between the draw rings. Once the workpiece 28 has been gripped between the upper and lower draw rings 24 and 26, the draw rings are lowered to deform the workpiece around a die (not shown) in a stretch forming operation.

The upper and lower draw rings or members 24 and 26 have a generally rectangular configuration with an open central portion. The openings in the central portions of the upper and lower draw rings 24 and 26 have configurations corresponding to the configurations of the die around which the workpiece 28 is to be drawn. It should be understood that the upper and lower draw rings 24 and 26 have only been shown very schematically in the drawings and may have any desired configuration.

When the press assembly 20 is operated to stretch draw the sheet metal workpiece 28, a drive assembly 32 moves the upper draw ring 24 downwardly toward the workpiece 28. As the downward motion of the upper draw ring 24 continues, the upper draw ring and workpiece 28 impact against the lower draw ring 26 to firmly grip the edges of the sheet metal workpiece. The upper and lower draw rings 24 and 26 are then lowered together to stretch the workpiece 28 over the lower die and thereby deform the workpiece.

A cushion assembly 34 is mounted on the base 22. The cushion assembly 34 applies a yieldable force to the lower draw ring 26. This yieldable force opposes downward movement of the lower draw ring 26 during operation of the press assembly to a closed condition. Thus, the cushion assembly 34 cushions movement of components of the press assembly 20 during the closing of the press assembly. Although only a single cushion assembly 34 has been shown schematically in the drawings, it should be understood that the press assembly 20 includes a plurality of cushion assemblies 34.

In accordance with one of the features of the present invention, a control assembly 36 is operable to effect acceleration of the lower draw ring 26 before the upper draw ring 24 closes on the lower draw ring. In addition, the control assembly 36 is operable to effect deceleration of the lower draw ring 26 before it is stopped at the initial position shown in FIG. 1 during operation of the press assembly 20 from a closed condition to an open condition. By accelerating the lower draw ring 26 during closing of the press assembly 20, shock loading is reduced when the upper draw ring 24 and workpiece 28 are impacted against the lower draw ring 26. By decelerating the lower draw ring 26 during opening of the press assembly 20, rebounding of the lower draw ring 26 and press vibration are reduced as the lower draw ring is stopped at its initial position. Although only a single control assembly 36 has been shown schematically in the drawings, it should be understood that the press assembly 20 includes a plurality of control assemblies 36.

Cushion Assembly

The cushion assembly 34 includes a piston and cylinder assembly 40. The piston and cylinder assembly 40 includes a cylinder 42 which is connected with the base 22. A piston 44 divides the cylinder 42 into upper and lower variable volume chambers 46 and 48. The upper variable volume chamber 46 contains hydraulic fluid and is connected in fluid communication with an accumulator 52 through a conduit 54.

An adjustable flow control orifice 56 is provided in the conduit 54 to restrict hydraulic fluid flow through the conduit to a relatively low rate. A check valve 58 blocks hydraulic fluid flow from the variable volume chamber to the accumulator 52 through the main conduit 54. However, a restricted bleed passage 60 enables a small amount of hydraulic fluid to flow from the accumulator 52 to the upper variable volume chamber 46 in the cushion assembly 34 to compensate for any leakage of hydraulic fluid from the chamber.

The lower variable volume chamber 48 in the cushion assembly 34 is filled with a gas, specifically nitrogen. The lower variable volume chamber 48 is connected with the accumulator 52 through a conduit 64. The accumulator 52 is pressurized to maintain a predetermined minimum fluid pressure in the lower variable volume chamber 48.

During operation of the press assembly 20 from an open condition (FIG. 1) to a closed condition (FIG. 4), the lower draw ring 26 is supported by an upwardly extending piston rod 68 connected with the piston 44. As the press assembly 20 closes, the lower draw ring 26 moves the piston 44 downwardly and decreases the size of the lower variable volume chamber 48 (FIG. 1). As the gas in the lower variable volume chamber 48 is compressed, the cushion assembly 34 applies a yieldable force against the lower draw ring 26.

As the press assembly 20 is operated from the closed condition (FIG. 4) back to the open condition (FIG. 1), the cushion assembly 34 applies a force against the lower draw ring 26 to support the lower draw ring and move it back to the initial position shown in FIG. 1. As this happens, the lower variable volume chamber 48 increases in size. Although the size of the lower variable volume chamber 48 increases and the fluid pressure in the chamber 48 may tend to decrease, the fluid pressure is more than sufficient to maintain the piston 44 in the extended position shown in FIG. 1 and to support the lower draw ring 26.

Although only a single cushion assembly 34 has been shown in FIG. 1, it should be understood that there are a plurality of identical cushion assemblies to support the lower draw ring 26 and apply a yieldable force against the lower draw ring during closing of the press assembly. Thus, there is a rectangular array of cushion assemblies 34 to support the lower draw ring 26.

Control Assembly

The control assembly 36 is operable to effect acceleration of the lower draw ring 26 in a downward direction prior to impacting of the workpiece 28 and upper draw ring 24 against the lower draw ring during operation of the press assembly 20 to the closed condition. In addition, the control assembly 30 is operable to effect deceleration of the draw ring 26 prior to stopping of the draw ring during operation of the press assembly 20 to the open condition. To accomplish this, the control assembly 36 transmits force between the cushion assembly 34 and the upper draw ring 24.

The control assembly 36 includes a piston and cylinder assembly 70. The piston and cylinder assembly 70 includes a cylinder 72 disposed in the base 22 and having a central axis extending parallel to a central axis of the cushion cylinder 42. A control piston 74 is disposed in the cylinder 72 and divides the cylinder into upper and lower variable volume chambers 76 and 78. The lower variable volume chamber 78 contains hydraulic fluid and is connected in fluid communication with the upper chamber 46 of the cushion assembly 64 through a conduit 80. The upper variable volume chamber 76 of the control assembly 36 is vented to the atmosphere.

A force transmitting member or pin 84 is engaged by a piston rod 86 connected with the control piston 74. The force transmitting member 84 transmits force between the upper draw ring 24 and the control assembly 36. The cylindrical force transmitting member 84 extends through a cylindrical opening 90 formed in the lower draw ring 26 and engages an upper end of the piston rod 86. Although it is preferred to form the force transmitting member 84 separately from the piston rod 86, it is contemplated that the piston rod 86 could be extended through the opening 90 so that the piston rod itself would function as the force transmitting member. If desired, the force transmitting member 84 and piston rod 86 could be disposed to one side of the lower draw ring 26 so that it would not be necessary to have an opening 90 extending through the lower draw ring 26.

It should be understood that although only a single control assembly 36 has been shown in FIG. 1, there are a plurality of identical control assemblies 36 arranged in a rectangular array about the periphery of the lower draw ring 26. The plurality of control assemblies are connected in fluid communication with and operable to transmit hydraulic fluid pressure forces to a plurality of cushion assemblies 34 which are also disposed in a rectangular array about the periphery of the lower draw ring 26.

Operation

When the press assembly 20 is in the open condition of FIG. 1, the upper draw ring 24 is spaced a substantial distance above the lower draw ring 26. The lower draw ring 26 is supported by the extended cushion assembly 34. At this time, the force transmitting member 84 projects upwardly from the upper side of the lower draw ring 26 toward the upper draw ring 24. The force transmitting member 84 is supported on the upper end of the piston rod 86 of the extended control piston and cylinder assembly 70.

The workpiece 28 is disposed between the upper and lower draw ring 24 and 26. The workpiece is supported by the lower draw ring 26 and is disposed inwardly of the force transmitting member 84. Thus, although the force transmitting member 84 extends into the opening 90 in the lower draw ring 26, the force transmitting member does not extend through the workpiece 28.

The cushion assembly 34 is maintained in the extended condition shown in FIG. 1 by the fluid pressure, that is, nitrogen gas pressure, in the lower variable volume chamber 48. The gas pressure in the lower variable volume chamber 48 and accumulator 52 is more than adequate to support the lower draw ring 26 and cushion piston 44. The control assembly 36 is maintained in the extended condition shown in FIG. 1 by hydraulic fluid pressure in the lower variable volume cylinder chamber 78. The fluid pressure in the variable volume cylinder chamber 78 is more than adequate to support the control piston 74 and force transmitting member 84.

The fluid pressure in the lower variable volume chamber 78 of the control assembly 36 is the same as the fluid pressure in the lower variable volume chamber 48 of the cushion assembly 34. This is because fluid pressure is transmitted from the accumulator 52 to the lower variable volume chamber 48 of the cushion asembly 34 through the conduit 64. Fluid pressure is transmitted from the accumulator 52 to the lower variable volume chamber 78 of the control assembly 36 through the conduit 54, upper variable volume chamber 46 of the cushion assembly 34, and conduit 80. The relatively high nitrogen gas pressure which is maintained on the upper side of a body of hydraulic fluid in the accumulator 52 enables the accumulator to make up for any leakage of fluid from either the cushion assembly 34 or the control assembly 36.

When the press assembly 20 begins to operate from the open condition of FIG. 1 toward the closed condition of FIG. 4, the drive assembly 32 moves the upper draw ring 24 downwardly toward the lower draw ring 26 in a known manner. At this time, the lower draw ring 26 is stationary in the initial position shown in FIG. 1. The cushion assembly 34 and control assembly 36 are in their extended conditions.

As the upper draw ring 24 moves toward the lower draw ring 26, the lower side of the upper draw ring 24 engages the force transmitting member 84 (FIG. 2). As the upper draw ring 24 moves into engagement with the force transmitting member 84, force is transmitted from the upper draw ring 24 to the cushion assembly 34 to initiate operation of the cushion assembly toward a retracted condition. As the cushion assembly 34 is retracted, the lower draw ring 26 is accelerated in a downward direction.

When the upper draw ring 24 engages the force transmitting member 84 (FIG. 2), the force transmitting member 84 is pressed downwardly against the piston rod 86 in the control assembly 36. The force applied against the piston rod 86 is transmitted to the piston 74. The piston 74 applies force against the hydraulic fluid in the lower variable volume chamber 78. The fluid pressure generated in the lower variable volume chamber 78 by the piston 74 causes hydraulic fluid to flow from the control assembly 36 through the conduit 80 to the cushion assembly 34.

The flow of fluid from the control assembly 36 to the cushion assembly 34 causes the assembly to retract (FIG. 2). Thus, hydraulic fluid flows from the conduit 80 into the upper variable volume chamber 46 of the cushion assembly 34. The fluid pressure in the upper variable volume chamber 46 causes the piston 44 to move downwardly and compress the gas in the lower variable volume chamber 48. As the piston 44 moves downwardly, the piston rod 68 and lower draw ring 26 move downwardly. This is because the lower draw ring 26 is supported on the piston rod 68 and is movable with the piston rod.

Although the lower draw ring 26 is accelerated in a downward direction by retraction of the cushion assembly 34, the downward speed of movement of the lower draw ring 26 (FIG. 2) is less than the downward speed of movement of the upper draw ring 24. This is because the head end area of the control assembly piston 74 is less than the rod end area of the cushion assembly piston 44. Thus, the control assembly 36 retracts at a greater rate than does the cushion assembly 34.

To discharge an incremental volume of fluid from the control assembly 36, the piston 74 moves downward through a predetermined distance. This results in a corresponding incremental volume of fluid flowing from the conduit 80 into the upper variable volume chamber 46 of the cushion assembly 34. The flow of hydraulic fluid into the upper variable volume chamber 46 causes the cushion piston 44 to move downward through a smaller distance than the control piston 74.

The relationship between the size of the head end area on the control piston 74 and the rod end area on the cushion piston 44 can be any desired relationship. However, in the illustrated embodiment of the invention, the rod end area on the cushion piston 44 was twice as great as the head end area on the control piston 74. Therefore, in this one specific embodiment of the invention, the cushion piston 44 moves downwardly at one-half the speed at which the control piston 74 moves downwardly. Therefore, the lower draw ring 26 moves downwardly at one-half of the speed of the upper draw ring 24. Of course, the relationship between the downward speed of movement of the upper and lower draw rings 24 and 26 can be changed by changing the relationship between the rod end and head end areas of the cushion and control pistons 44 and 77.

Since the speed of downward movement of the lower draw ring 26 is less than the speed of downward movement of the upper draw ring 24, the upper draw ring and workpiece 28 impact against the slower moving lower draw ring 26 (FIG. 3). When the upper draw ring 24 impacts against the lower draw ring 26, the workpiece 28 is gripped between the draw rings and the draw rings move downwardly together. Since the lower draw ring 26 is moving downwardly when the upper draw ring 24 and workpiece 28 impact against the lower draw ring 26, the shock loading forces on the press assembly 20 are substantially less than would be the case if the lower draw ring 26 was stationary when the upper draw ring impacted with the lower draw ring. In addition to reducing shock loading forces, having the lower draw ring 26 moving downwardly the amount of noise associated with operating the press assembly 20.

As the upper and lower draw rings 24 and 26 move downwardly together (FIG. 3) with the workpiece 28 gripped between them, the cushion assembly 34 and control assembly 36 are retracted at the same rate. This is because the cushion assembly piston 44 and the control assembly piston 74 move downwardly with the upper and lower draw rings 26 and 24 which are moving downwardly at the same speed. As the piston 44 in the cushion assembly 34 moves downwardly under the influence of force transmitted to the piston rod 68 from the lower draw ring 26, the gas in the lower variable volume chamber 48 is compressed. Since the rod end area of the cushion piston 44 is twice as great as the head end area of the piston 74, the upper variable volume chamber in the cushion assembly 34 expands at a greater rate than the rate of contraction of the lower variable volume chamber 78 in the control assembly 36. This results in the occurrence of cavitation in the upper variable volume chamber 46 of the cushion assembly 34.

When cavitation occurs in the upper variable volume chamber 46, hydraulic fluid can flow from the accumulator 52 (FIG. 1) through the conduit 54 and check valve 58 to the upper variable volume chamber. However, the flow restrictor valve 56 (FIG. 1) is set to limit the rate of hydraulic fluid flow to a very small amount which, for all practical purposes, can be ignored. However, this rate of hydraulic fluid flow is adequate to compensate for any leakage which may occur in the system.

Since cavitation occurs in the upper variable volume chamber 46 of the cushion assembly 34, there is a relatively large pressure differential across the piston 44. This enables the cushion assembly 34 to provide a substantial upwardly directed and yieldable force opposing downward movement of the piston 44 as the gas in the lower variable volume chamber 48 is compressed. Due to the substantial pressure differential across the cushion piston 44, the cushion assembly 34 is operable to cushion shock loading on the components of the press assembly as the press assembly moves to the fully closed condition of FIG. 4.

When the press assembly 20 is closed (FIG. 4), the cushion assembly 34 is retracted. The control assembly 36 is also retracted. The upper and lower draw rings 24 and 26 are in their lowermost positions. At this time, the workpiece 28 has been fully deformed by a die during a stretch draw operation.

Immediately after the press assembly 20 reaches the closed condition of FIG. 4, the press assembly 20 starts to operate back to the open condition of FIG. 1. As the press assembly starts to open, the press drive assembly 32 (FIG. 1) moves the upper draw ring 24 upwardly away from the base 22. As the upper draw ring 24 moves upwardly away from the base 22, the cushion assembly 34 expands to move the lower draw ring 26 upwardly with the upper draw ring 24. Thus, gas pressure in the lower variable volume chamber 48 of the cushion assembly 34 presses the piston 44 upwardly to maintain the lower draw ring 26 in abutting engagement with the upper draw ring 24 and workpiece 28.

As the upper and lower rings 24 and 26 move upwardly together (FIG. 5), the lower cushion chamber 48 expands and the upper cushion chamber 46 contracts. This results in the elimination of the cavitation which previously occurred in the upper cushion chamber 46. During this initial upward movement of the cushion piston 44, fluid is not pumped from the cushion assembly 34 to the control assembly and the control assembly 36 remains contracted.

As soon as the cavitation has been eliminated in the upper cushion chamber 46, hydraulic fluid is pumped from the upper cushion chamber through the conduit 80 to move the control piston upwardly 74. The hydraulic fluid pressure force applied against the control piston 74 is transmitted through the piston rod 86 and force transmitting member 84 to the upper draw ring 24 to urge the upper draw ring 24 upwardly (FIG. 5). This results in the transmission of energy back to the drive assembly 32 (FIG. 1).

During continued operation of the press assembly 20 toward the open condition, the speed of upward movement of the lower draw ring 26 is decreased relative to the speed of movement of the upper draw ring 24. Thus, the lower draw ring 26 is decelerated relative to the upper draw ring 24. This results in the upper and lower draw rings 24 and 26 separating in a manner shown schematically in FIG. 6.

The deceleration of the lower draw ring 26 and separation of the upper and lower draw rings results from the fact that the rod end of the cushion piston 44 has a larger area than the head end of the control piston 74. Thus, once the cavitation has been eliminated in the upper cushion chamber 46, hydraulic fluid is pumped from the upper chamber in the cushion assembly 34 to the lower chamber 78 in the control assembly 36. The lower chamber 78 in the control assembly 36 expands at a rate which is determined by the speed of upward movement of the upper draw ring 24. Thus, for each increment of upward movement of the draw ring 24, the control piston 74 moves up one increment.

Since the head end area of the control piston 74 is only half as great as the rod end area of the cushion piston 44, the cushion piston can move upwardly to contract the upper cushion chamber 46 at a rate which is only one-half of the rate of expansion of the lower control chamber 78. Therefore, the cushion piston 44 moves upwardly at half the speed of the control piston 74. This results in the speed of upward movement of the lower draw ring 26 being reduced to half the speed of upward movement of the upper draw ring 24.

The gas in the lower cushion chamber 48 is constantly pressing the cushion piston 44 upwardly to pressurize the hydraulic fluid in the upper variable volume chamber 46 of the cushion assembly. This results in fluid pressure being transmitted through the conduit 80 to the lower control chamber 78. The hydraulic fluid pressure in the lower control chamber 78 presses the piston 74 and piston rod 86 upwardly to apply an upwardly directed force against the force transmitting member 84.

The force transmitting member 84 abuts the upper draw ring 24 and moves upwardly at the same speed as the upper draw ring 24. However, the speed of upward movement of the upper draw ring 24 is determined by the press drive 32. This results in the hydraulic fluid pressure in the lower chamber 78 of the control assembly being effective to apply force against the upper draw ring 24 urging the upper draw ring 24 upwardly. At this time, the rate of expansion of the cushion assembly 34 is retarded to one-half of the rate of expansion of the control assembly 36.

As the upper draw ring 24 continues to move upwardly, the cushion assembly 34 approaches a fully extended condition and the lower draw ring 26 approaches the initial or open press position shown in FIG. 1. When the cushion assembly 34 is fully extended, the upper draw ring 24 will have moved to its initial or open press position. The upward movement of the lower draw ring 26 is then stopped and the lower draw ring remains stationary in its initial position.

Since the lower draw ring 26 was decelerated to one-half of the speed of the upper draw ring 24, the inertia of the lower draw ring 26 is less than it would be if the lower draw ring 26 was moving at the same speed as the upper draw ring 24. Therefore, the tendency for the lower draw ring 26 to bounce when it is stopped at its initial open press position is substantially reduced. This results in a substantial reduction in the rebounding loads and vibrations to which the press assembly 20 is subjected.

After the lower draw ring 26 has reached the initial or open press condition, the upper draw ring 24 continues to move upwardly away from the lower draw ring 26 under the influence of the press drive assembly 32. This results in the upper draw ring 24 moving away from the force transmitting member 84. When the upper draw ring 24 reaches the open press or initial position of FIG. 1, upward movement of the upper draw ring 24 is stopped. Once the press assembly 20 has been operated to the open condition of FIG. 1, the deformed workpiece 28 can be readily removed from the press assembly 20.

Cushion Assembly - Seals

Although it is contemplated that the cushion assembly 34 could have many different constructions, one specific construction of the cushion assembly 34 is illustrated in FIG. 7. The cushion assembly 34 includes an outer seal assembly 92 (FIG. 7) which blocks the entrance of dirt and other foreign material between the piston rod 68 and the base 22. An inner seal assembly 94 blocks fluid flow from the upper cushion chamber 46. A piston seal assembly 96 blocks fluid flow between the upper and lower chambers 46 and 48 of the cushion assembly 34.

The outer seal assembly 92 includes an annular bearing or support member 102 having an upwardly opening annular recess in which a seal ring 104 is disposed. A radially inner portion of the seal ring 104 sealingly engages the cylindrical outer side surface of the piston rod 68. A radially outer portion of the seal ring 104 sealingly engages a cylindrical inner side surface of the recess in the bearing or support member 102. An annular seal ring 106 is provided between the seal ring 104 and at annular retaining or closing flange 108.

The bearing or support member 102 is disposed in an annular recess 112 formed in a housing section 114. The bearing member 102 and seal ring 104 are shiftable radially relative to the annular recess 112 in the housing section 114 to accommodate tilting movement of the piston rod 68. Thus, the outer seal assembly 92 maintains a tight seal between the piston rod 68 and the housing section flange 108 upon movement of the piston rod 68 from the the initial position (as shown in FIG. 7) to either a leftward or rightward tilted position. The construction of the outer seal assembly 92 and the manner in which it cooperates with the piston rod 68 is the same as is disclosed in U.S. Pat. No. 4,765,227.

The inner seal assembly 94 includes a rigid cylindrical metal support member 120 which extends around the piston rod 68 and is coaxial with the piston rod. An annular end seal 122 is disposed in an upwardly facing annular recess 124 formed in the generally cylindrical support member 120 and sealingly engages an annular inwardly extending flange 126 on the housing section 114. The end seal 122 blocks fluid flow between the outside of the support member 120 and the housing section 114.

An annular bearing ring 128 is provided between the cylindrical outer side surface of the piston rod 68 and a cylindrical inner side surface of the support member 120. The bearing ring 128 abuts and is effective to transmit force between the piston rod 68 and the support member 120. This force shifts the support ring 120 radially relative to the housing section 114 upon tilting movement of the piston rod 68 relative to the base 22.

An annular rod seal 132 is provided between the cylindrical outer side surface of the piston rod 68 and the cylindrical inner side surface of the support member 120. The rod seal 132 sealingly engages the outer side surface of the piston rod 68 and a cylindrical inner side surface of the support member 120. The rod seal 132 blocks fluid flow between the piston rod 68 and support member 120.

An annular metal stop ring 138 is fixedly clamped between the housing section 114 and a cylindrical cylinder sleeve 140. The rigid annular metal ring 138 provides a stop to limit upward movement of the cushion piston 44. In addition, the stop ring 138 conducts hydraulic fluid to and from the upper variable volume chamber 46 in the cushion assembly 34.

The stop ring 130 has an annular bottom surface 144 which is abuttingly engaged by an annular shoulder 146 on the piston 44 to limit upward movement of the piston. A plurality of radially extending passages 148 are provided in the stop ring 138. The radially extending passages conduct fluid to and from an annular outwardly opening recess 150 in the stop ring 138. Thus, fluid can flow either into or out of the upper cushion chamber 46 through the passages 148 in the stop ring 138. The annular recess 150 is connected in fluid communication with a cylindrical manifold chamber 152 which extends around the outside of the cylinder sleeve 140 by a plurality of radially extending passages 154. The manifold chamber 152 is connected in fluid communication with the conduit 80 which connects the cushion assembly 34 with the control assembly 36.

The end seal 122 is pressed upwardly against the outwardly projecting housing flange 126 by an annular wave spring 160. The spring 160 is disposed between the support member 120 and the stop ring 138. Upon tilting movement of the piston rod 68, the annular spring 160 moves radially relative to the stop ring 138. In addition, some movement may occur between the support ring 120 and the spring 160.

An annular piston seal 164 extends between the piston 44 and the cylinder liner 140. The piston seal 164 blocks fluid flow between the piston 44 and the cylinder liner 140. An annular backing or support ring 166 is provided for the piston seal ring 164.

It is contemplated that during operation of the press assembly 20, a small amount of hydraulic fluid will leak past the inner seal assembly 94 into an annular space 172 disposed between the inner and outer seal assemblies 92 and 94. The annular space 172 is connected with a drain passage 174 which extends through a check valve 176 to an annular space 178. The annular space 178 is connected with a drain passage 180 formed in the base 22.

Control Assembly - Second Embodiment

In the embodiment of the invention illustrated in FIGS. 1-6, the control assembly 36 effects acceleration of the lower draw ring 26 after the upper draw ring 24 has engaged the force transmitting member 84. To reduce shock loading forces, the upper draw ring 24 and workpiece 28 impact against the lower draw ring 26 while the lower draw ring is moving at the speed to which it was accelerated by the control assembly 36. It is contemplated that the shock loading forces on the components of the press assembly 20 could be further reduced by effecting further acceleration of the lower draw ring 26 before the upper draw ring 24 and workpiece 28 impact with the lower draw ring 26.

Figure 8:
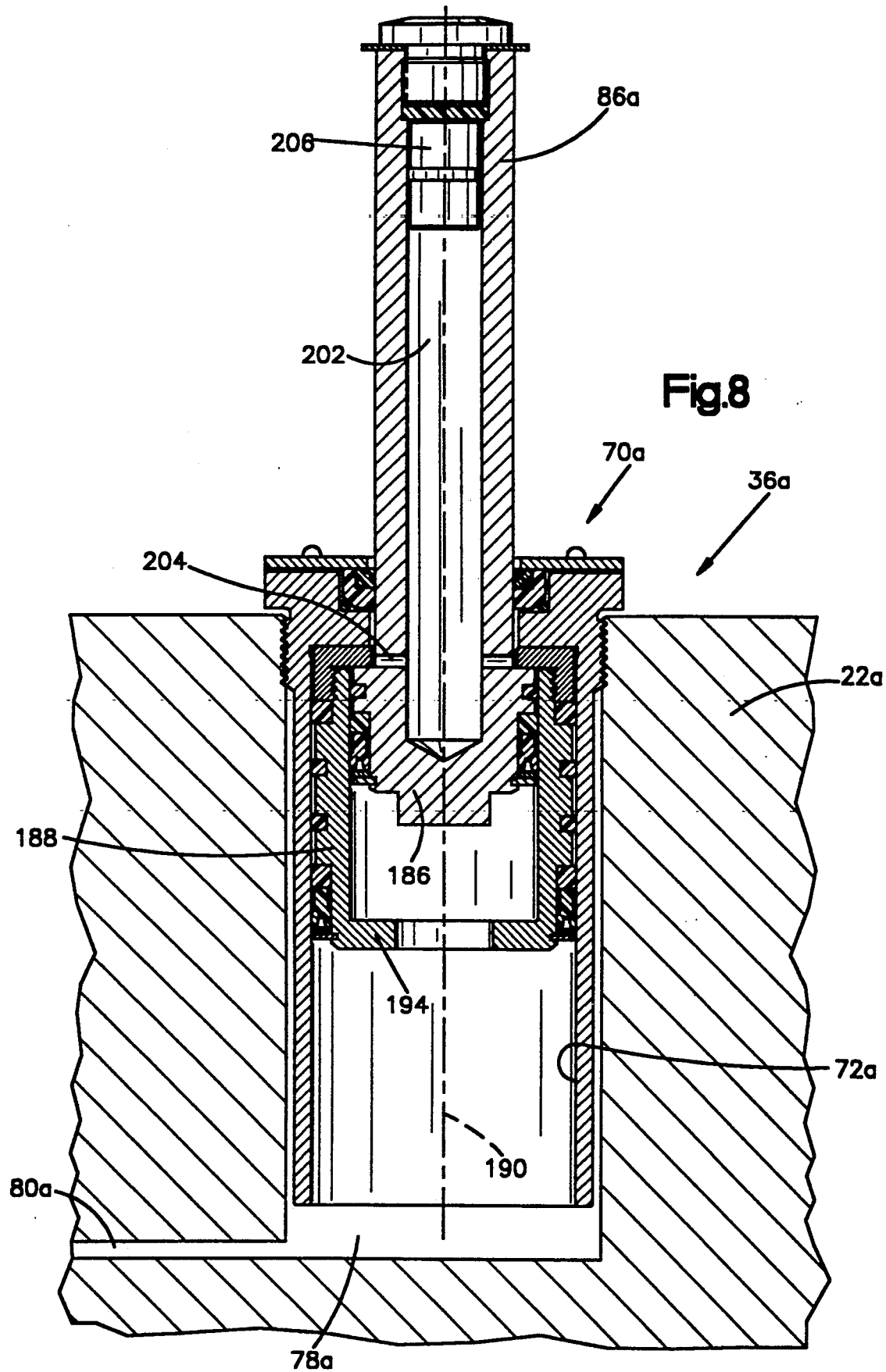
FIG. 8 is a sectional view of a two stage piston and cylinder assembly forming a second embodiment of a portion of the control assembly used in the press assembly of FIGS. 1-6, the piston and cylinder assembly being shown with an inner piston and an outer piston at their upper end of stroke positions.

In the embodiment of the control assembly which is partially illustrated in FIGS. 8-10, the control assembly is operable during closing and opening of the press assembly 20 to accelerate and decelerate the lower draw ring 26 in two distinct steps. Thus, during closing of the press assembly, the control assembly of FIGS. 8-10 accelerates the lower draw ring 26 to a first speed and then to a second speed before the upper and lower draw rings move together. Similarly, during opening of the press assembly 20, the control assembly of FIGS. 8-10 decelerates the lower draw ring 26 to a first speed and then decelerates the draw ring to a second speed prior to stopping of the draw ring at its initial position. Since the embodiment of the control assembly which is partially illustrated in FIGS. 8-10 is generally similar to the embodiment of the control assembly illustrated in FIGS. 1-6, similar numerals will be utilized to designate similar components, the suffix letter "a" being associated with the numerals of FIGS. 8-10 to avoid confusion.

The control assembly 36a (FIG. 8) includes a two stage piston and cylinder assembly 70a. The piston and cylinder assembly 70a includes an inner piston 186 which is fixedly connected with piston rod 86a and hollow outer piston 188 which encloses the inner piston 186. The cylindrical inner and outer pistons 186 and 188 have a limited range of movement relative to each other.

The outer piston 188 has a larger head end cross sectional area than the inner piston 186. Thus, the cross sectional area of the outer piston 188, as measured in a plane extending perpendicular to the longitudinal central axis 190 of the piston and cylinder assembly 70a, is twice as great as the cross sectional area of the inner piston 186 as measured in a plane extending perpendicular to the axis 190.

In the specific embodiment of the control assembly 36a illustrated in FIG. 8, the cross sectional area of the inner piston 186 is one-third of the rod end area of the cushion piston 44 (FIG. 1). The cross sectional area of the outer piston 188 is two-thirds of the rod end area of the cushion piston 44. Of course, the areas of the pistons 186 and 188 could have a different relationship to each other and to the rod end area of the cushion piston 44.

During operation of the press assembly 20 (FIG. 1) from the open condition to the closed condition, the inner piston 186 is initially moved downwardly relative to the outer piston 188 (FIG. 9) with the upper draw ring 24. This effects acceleration of the cushion piston 44 and lower draw ring 26 to a speed which is one-third of the speed of the upper draw ring 24. As the press assembly continues to close, the inner and outer pistons 186 and 188 move downwardly together (FIG. 10). Movement of the pistons 186 and 188 downwardly together forces fluid out of the control assembly 36a into the cushion assembly 34 to effect acceleration of the cushion piston 44 and lower draw ring 26 to a speed which is equal to two-thirds of the speed of the upper draw ring 24.

After the lower draw ring 26 has been accelerated to a speed which is equal to two-thirds of the speed of the upper draw ring 24, the upper draw ring and workpiece 28 impact against the lower draw ring. Since the lower draw ring 26 is moving downwardly at a speed which is equal to two-thirds of the downward speed of the upper draw ring 24 when the upper draw ring 24 closes against the lower draw ring 26, the shock loading to which the components of the press assembly are subjected is less than in the embodiment of the invention illustrated in FIGS. 1-6.

When the press assembly is being operated from the closed condition of FIG. 4 back to the open condition of FIG. 1, the inner and outer pistons 186 and 188 cooperate to effect deceleration of the lower draw ring 26 and cushion piston 44 to a speed which is two-thirds of the speed of the upper draw ring 24. As the press assembly 20 continues to close, the inner piston 186 of the control assembly 36a effects deceleration of the cushion piston 44 and lower draw ring 26 to a speed which is only one-third of the speed of the upper draw ring 24.

During operation of the press assembly 20 (FIG. 1) from the closed condition to the open condition, the inner and outer pistons 186 and 188 move upwardly together from their lower end of stroke positions. This effects deceleration of the cushion piston 44 and lower draw ring 26 from a speed which is equal to the speed of the upper draw ring 24 to a speed which is two-thirds of the speed of the upper draw ring. As the press assembly continues to open, the outer piston 188 reaches is upper end of stroke position (FIG. 9) and the inner piston 186 moves upwardly relative to the outer piston 188. This effects deceleration of the cushion piston 44 and lower draw ring 26 from a speed which is two-thirds of the speed of the upper draw ring 24 to a speed which is one-third of the speed of the upper draw ring.

After the lower draw ring 26 has been decelerated to a speed which is equal to one-third of the speed of the upper draw ring 24, the lower draw ring moves to its initial or open press position. Since the lower draw ring 26 is moving upwardly at a speed which is one-third the speed of the upper draw ring 24, the inertia of the lower draw ring is relatively small as it approaches its initial position. Therefore, rebounding of the lower draw ring 26 when it reaches its initial position and vibration of components of the press assembly are minimized.

When the press assembly 20 is in the open condition of FIG. 1, the piston and cylinder assembly 70a is in the fully extended condition of FIG. 8. At this time, the inner and outer pistons 186 and 188 are at their upper end of stroke positions. The lower variable volume chamber 78a is filled with hydraulic fluid. The upper end of the piston rod 86a is disposed in abutting engagement with the lower end of the force transmitting member 84 (FIG. 1) which extends upwardly of the lower draw ring 26.

As the upper draw ring 24 moves downwardly toward the lower draw ring 26 (FIG. 1), the upper draw ring 24 moves into abutting engagement with the force transmitting member 84. The force transmitting member 84 transmits force from the upper draw ring 24 to the piston rod 86a of the piston and cylinder assembly 70a (FIG. 8). As the upper draw ring 24 and the force transmitting member 84 continue to move downwardly, the force transmitting member moves the inner piston 186 downwardly relative to the stationary outer piston 188 (FIG. 9).

As the inner piston 186 moves downwardly under the influence of force transmitted from the upper draw ring 24, the lower variable volume control chamber 78a contracts and fluid under pressure is pumped from the control assembly 36a (FIG. 9) through the conduit 80a to the cushion assembly 34 (FIG. 1). The hydraulic fluid pumped into the upper variable volume chamber 46 in the cushion assembly 34 causes the cushion piston 44 to move downwardly and compress the nitrogen gas in the lower variable volume chamber 48. Since the head end area of the inner control piston 186 is one-third of the rod end area of the cushion piston 44, the cushion piston is accelerated to a speed which is one-third of the downward speed of the upper draw ring 24 and inner piston 186. This results in the lower draw ring 26 moving downward at a speed which is one-third of the downward speed of the upper draw ring 24.

As the upper draw ring 24 continues to move downwardly, the head end of the inner piston 186 engages an annular inwardly projecting head end flange 194 (FIGS. 9 and 10) on the hollow outer piston 188. Force is then transmitted from the upper draw ring 24 through the force transmitting member 84 and inner piston 186 to the outer piston 188 (FIGS. 1 and 10). This causes the outer piston 188 to move downwardly with the inner piston 186 and upper draw ring 24.

As the inner and outer pistons 186 and 188 start to move downwardly together, the head end area of the control piston assembly 36a increases from the relatively small head and area of the inner piston 186 to the relatively large head end area of the outer piston 188 (FIG. 10). This results in fluid being forced out of the contracting lower variable volume control chamber 78a at a higher rate through the passage 80a to the cushion assembly 34.

Since the rate at which hydraulic fluid is discharged from the control assembly 36a to the cushion assembly 34 has increased, the rate of downward movement of the cushion piston 44 (FIG. 1) and lower draw ring 26 increases. In the specific embodiment of the invention described herein, the cushion piston 44 and lower draw ring 26 are accelerated to a downward speed which is equal to two-thirds of the downward speed of the upper draw ring 24.

The lower draw ring 26 continues to move downwardly at a speed which is two-thirds the speed of the upper draw ring 24 until the upper draw ring 24 and workpiece 28 are impacted against the lower draw ring 26. Thereafter, the upper and lower draw rings 24 and 26 move downwardly together until the press assembly 20 reaches the closed condition of FIG. 4. As was previously explained, during downward movement of the upper and lower draw rings 24 and 26 together, the rate of fluid flow from the control assembly 36a is insufficient to fill the upper cushion chamber 46 so that cavitation occurs in the upper cushion chamber 46 as the gas is compressed in the lower cushion chamber 48.

When the press assembly 20 starts to open, the upper and lower draw rings 24 and 26 move upwardly together until the cavitation in the upper cushion chamber 46 is eliminated. Thereafter, hydraulic fluid is discharged from the upper cushion chamber 46 and causes the inner and outer pistons 186 and 188 to move upwardly together (FIG. 10). Since the head end area of the outer piston 188 is only two-thirds of the rod end area of the cushion piston 44, the inner and outer pistons 186 and 188 press the piston rod 86a against the upper draw ring 24 to transmit force to the upper draw ring 24.

Due to the fact that the rod end area of the cushion piston 44 is one-third larger than the head end areas of the control pistons 186 and 188, the cushion piston decelerates from the speed of upward movement of the upper draw ring 24 to a speed which is only two-thirds of the speed of movement of the upper draw ring 24. As this occurs, the upper and lower draw rings 24 and 26 separate.

When the outer control piston 188 reaches its upper end of stroke position (FIG. 9), the inner control piston 186 moves upwardly relative to the stationary outer piston. Since the head end area of the inner piston 186 is only one-third of the rod end area of the cushion piston 44, the rate of upward movement of the cushion piston is retarded. This decelerates the lower draw ring 26 and cushion piston 44 to a speed which is only one-third of the speed of the upper draw ring 24.

As the inner piston 186 continues to move upwardly with the upper draw ring 24, the inner piston 186 moves to its end of the stroke position. At the same time, the cushion piston 44 moves to its end of the stroke position. Thereafter, the upward movement of the cushion piston 44 stops. This results in the lower draw ring 26 stopping at its initial or open press position (FIG. 1).

The speed of upward movement of the lower draw ring 26 is decreased in two steps before the draw ring is stopped at its initial position. Thus, the speed of upward movement of the lower draw ring 26 is decreased from a speed which is equal to the speed of upward movement of the upper draw ring 24 to a speed which is two-thirds of the speed of upward movement of the upper draw ring 24. After the speed of the lower draw ring 26 has been maintained constant for a short time, the speed of the lower draw ring is decreased to a speed which is only one-third the speed of the upper draw ring 24. Therefore, the lower draw ring 26 has relatively little inertia as it moves to its initial position. This tends to minimize rebounding of the lower draw ring 26 and vibration of the press assembly 20.

The upper variable volume chamber 76a (FIG. 10) in the piston and cylinder assembly 70a is connected in fluid communication with the atmosphere through the piston rod 86a. Thus, a central passage 202 in the piston rod 86a is connected with the upper chamber 76a through radial passages formed in the piston rod. The upper end of the central passage 202 is connected with the atmosphere through a combined check valve and pressure relief valve assembly 206. The combined check valve and pressure relief valve assembly has the same construction disclosed in U.S. Pat. No. 4,765,227. However, the chamber 76a could be vented to the atmosphere in other known ways if desired.

In the embodiment of the invention illustrated of FIGS. 8–10, there is a specific area relationship between the head ends of the inner and outer pistons 186 and 188 in the control assembly 36a and the rod end of the cushion piston 44 in the cushion assembly 34. It should be understood that the specific area relationships between the pistons have been set forth herein for purposes of clarity of description and not for the purposes of limitation of the invention. Thus, the head end areas of the inner and outer pistons 186 and 188 could be a different ratio or function of the rod end area of the cushion piston 44 if desired.

Although the control assemblies 36 and 36a have been described herein in conjunction with the upper and lower draw rings 24 and 26 of a press, it is contemplated that the control assemblies could be utilized with different components of a press if desired. Thus, in a press assembly which was not intended for use in stretch drawing operations, the control assemblies 36 and 36a could be associated with components of the press assembly other than draw rings. It should also be understood that although the draw rings 24 and 26 have been shown as moving downwardly to effect operation of the press assembly from the open condition of FIG. 1 to the closed condition of FIG. 4, the press assembly could be constructed in such a manner as to have the draw rings move upwardly during operation of the press assembly to the closed condition. If this was done, the draw ring 24 would be moved upwardly until it engaged the force transmitting member 84 and caused the control assembly 36 to contract to effect retraction of the cushion assembly 34 and upward movement of the draw ring 26. Although the cushion assembly 34 has been described herein as having a specific construction, a different cushion assembly construction could be utilized if desired.

SUMMARY

In view of the foregoing description, it is apparent that the present invention relates to a press assembly 20 having upper and lower draw rings or members 24 and 26 to apply pressure to opposite sides of a workpiece 28 during operation of the press assembly. When the press assembly 20 is operated from an open condition (FIG. 1) to a closed condition (FIG. 4), the upper draw ring 24 is moved downwardly toward the lower draw ring 26. Before the upper draw ring 24 impacts against the lower ring 26, the lower draw ring is accelerated in a downward direction (FIG. 2) by transmitting force from the upper draw ring to a cushion assembly 34. Force transmitted from the upper draw ring 24 to the cushion assembly 34 effects operation of the cushion assembly toward a retracted condition so that the lower ring 26 is moving downwardly when the upper draw ring impacts with the lower draw ring. Since the lower draw ring 26 is moving downwardly when it is impacted by the uper draw ring 24 (FIG. 3), shock loading on components of the press assembly 20 is minimized.

When the press assembly 20 is operated from a closed condition (FIG. 4) to an open condition (FIG. 1), operation of the cushion assembly from a retracted condition is opposed to effect deceleration of the lower draw ring 26 before it reaches its initial position. Thus, the speed of the lower draw ring 26 is reduced before it is stopped. This minimizes rebounding of the lower draw ring 26 and vibration of the press assembly 20.

Having described specific preferred embodiments of the invention, the following is claimed:

1. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition being operable to transmit force from said cushion assembly to said first member during operation of said press assembly from the closed condition toward the open condition.

2. A press assembly as set forth in claim 1 wherein said means for transmitting force from said first member to said cushion assembly during operation of said press assembly from the open condition toward the closed condition includes means for conducting fluid pressure from said cushion assembly during operation of said press assembly from the closed condition to the open condition and means for converting the fluid pressure to force and transmitting the force to said first member.

3. A press assembly as set forth in claim 1 wherein said second member includes surface means for defining an opening extending through said second member, said means for transmitting force from said first member to said cushion assembly extending through the opening in said second member.

4. A press assembly as set forth in claim 1 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

5. A press assembly as set forth in claim 4 wherein said means for transmitting force from said first member to said cushion assembly extends through said lower draw ring.

6. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition includes means for effecting movement of said second member in the first direction at a first speed during a first portion of the movement of said second member prior to movement of said first and second members together and means for effecting movement of said second member in the first direction at a second speed which is greater than said first speed during a second portion of the movement of said second member prior to movement of said first and second members together.

7. A press assembly as set forth in claim 6 wherein said first and second members are movable in a second direction opposite to the first direction during operation of said press assembly from the closed condition to the open condition, said control means including means for effecting movement of said second member in the second direction at a third speed during a first portion of the movement of said second member in the second direction and means for effecting movement of said second member in the second direction at a fourth speed which is less than the third speed during a second portion of the movement of said second member in the second direction.

8. A press assembly as set forth in claim 6 wherein said second member includes surface means for defining an opening extending through said second member, said means for transmitting force from said first member to said cushion assembly extending through the opening in said second member.

9. A press assembly as set forth in claim 6 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

10. A press assembly as set forth in claim 9 wherein said means for transmitting force from said first member to said cushion assembly extends through said lower draw ring.

11. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said first and second members being movable in a second direction opposite to the first direction during operation of said press assembly from the closed condition to the open condition, said control means including means for effecting movement of said second member in the second direction at a first speed during a first portion of the movement of said second member in the second direction and while said first member is moving in the second direction at a speed which is greater than the first speed and means for effecting movement of said second member in the second direction at a second speed which is less than the first speed during a second portion of the movement of said second member in the second direction and while said first member is moving in the second direction at a speed which is greater than the second speed.

12. A press assembly as set forth in claim 11 wherein said second member includes surface means for defining an opening extending through said second member, said means for transmitting force from said first member to said cushion assembly extending through the opening in said second member.

13. A press assembly as set forth in claim 11 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

14. A press assembly as set forth in claim 13 wherein said means for transmitting force from said first member to said cushion assembly extends through said lower draw ring.

15. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said cushion assembly including wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said means for transmitting force from said first member to said cushion assembly including means for increasing the hydraulic fluid pressure in said second variable volume chamber to move said piston to increase the volume of said second variable volume chamber and decrease the volume of said first variable volume chamber.

16. A press assembly as set forth in claim 15 wherein said means for transmitting force from said first member to said cushion assembly during operation of said press assembly from the open condition toward the closed condition is operable to transmit force from said cushion assembly to said first member during operation of said press assembly from the closed condition toward the open condition.

17. A press assembly as set forth in claim 15 wherein said first and second members are movable together in a second direction opposite to the first direction during operation of said press assembly from the closed condition to the open condition, said control means including means for opposing operation of said cushion assembly during movement of said first and second members together in the second direction to decrease the speed of movement of said second member in the second direction to a speed which is less than the speed of movement of said first member in the second direction during operation of said press assembly from the closed condition to the open condition.

18. A press assembly as set forth in claim 15 wherein said second member includes surface means for defining an opening extending through said second member, said means for transmitting force from said first member to said cushion assembly extending through the opening in said second member.

19. A press assembly as set forth in claim 15 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

20. A press assembly as set forth in claim 19 wherein said means for transmitting force from said first member to said cushion assembly extends through said lower draw ring.

21. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition includes wall means for defining a cylinder chamber, a piston disposed in said cylinder chamber, means for transmitting force from said first member to said piston to pressurized fluid in said cylinder chamber, and means for conducting fluid pressure from said cylinder chamber to said cushion assembly, said cushion assembly including means for effecting operation of said cushion assembly toward the retracted condition under the influence of fluid pressure conducted from said cylinder chamber.

22. A press assembly as set forth in claim 21 wherein said second member includes surface means for defining an opening extending through said second member, said means for transmitting force from said first member to said cushion assembly extending through the opening in said second member.

23. A press assembly as set forth in claim 21 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

24. A press assembly as set forth in claim 23 wherein said means for transmitting force from said first member to said cushion assembly extends through said lower draw ring.

25. A press assembly operable from an open condition to a closed condition to deform a workpiece, said press assembly comprising a first movable member of engaging a first side of the workpiece, a second movable member for engaging a second side of the workpiece, said first member being movable in a first direction toward said second member during operation of said press assembly from an open condition toward a closed condition, said first and second member being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for transmitting force from said first member to said cushion assembly to initiate operation of said cushion assembly toward the retracted condition prior to movement of said first and second members together in the first direction during operation of said press assembly from the open condition toward the closed condition, said cushion assembly including a first piston and cylinder assembly and means for transmitting force from said second member to said first piston and cylinder assembly to effect operation of said cushion assembly toward the retracted condition during operation of said press assembly from the open condition toward the closed condition, said means for transmitting force from said first member to said cushion assembly during operation of said press assembly from the open condition toward the closed condition including a second piston and cylinder assembly, means for transmitting force from said first member to said second piston and cylinder assembly, and means for transmitting fluid pressure from said second piston and cylinder assembly to said first piston and cylinder assembly to effect operation of said first piston and cylinder assembly under the influence of fluid pressure transmitted from said second piston and cylinder assembly.

26. A press assembly as set forth in claim 25 wherein said second piston and cylinder assembly includes a cylinder, a first piston element disposed in said cylinder and, a second piston elememt disposed in said cylinder, said first piston element being movable relative to said second piston element and said cylinder to effect operation of said first piston and cylinder assembly at a first rate, said first and second piston elememts being movable together relative to said cylinder to effect operation of said first piston and cylinder assembly at a second rate which is greater than said first rate.

27. A press assembly as set forth in claim 25 wherein said second member includes surface means for defining an opening extending through said second member, said means for transmitting force from said first member to said cushion assembly extending through the opening in said second member.

28. A press assembly as set forth in claim 25 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

29. A press assembly as set forth in claim 28 wherein said means for transmitting force from said first member to said cushion assembly extends through said lower draw ring.

30. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition, and control means for retarding operation of said cushion assembly to effect movement of said second member in the second direction at a speed which is less than the speed of movement of said first member in the second direction during operation of said press assembly toward the open condition and operation of said cushion assembly toward the extended condition, said control means being ineffective to retard operation of said cushion assembly during an initial portion of the operation of said cushion assembly from the retracted condition toward the extended condition to enable said first and second members to move at the same speed in the second direction, said control means being effective to retard operation of said cushion assembly during a second portion of the operation of said cushion assembly from the retracted condition toward the extended condition to effect movement of said second member in the second direction at a second speed which is less than the first speed and which is less than the speed of movement of said first member in the second direction during the second portion of the operation of said cushion assembly, said control means being effective to further retard operation of said cushion assembly during a third portion of the operation of said cushion assembly from the retracted condition toward the extended condition to effect movement of said second member in the second direction at a third speed which is less than the second speed during the third portion of the operation of said cushion assembly.

31. A press assembly as set forth in claim 30 wherein said control means includes a cylinder, a first piston element disposed in said cylinder and a second piston element disposed in said cylinder, said first and second piston elements being movable together relative to said ciyinder during the second portion of the operation of said cushion assembly from the retracted condition toward the extended condition, said first piston element being movable relative to said second piston element and said cylinder during the third portion of the operation of said cushion assembly from the retracted condition toward the extended condition.

32. A press assembly as set forth in claim 30 wherein said second member includes surface means for defining an opening extending through said second member, said control means extending through the opening in said second member.

33. A press assembly as set forth in claim 30 wherein said first movable member is an upper draw ring, and said second movable member is a lower draw ring, said upper and lower draw rings being disposed in abutting engagement with opposite sides of the workpiece to grip the workpiece during operation of said press assembly toward the closed condition and deformation of the workpiece.

34. A press assembly as set forth in claim 33 wherein said control means extends through said lower draw ring.

35. A press assembly operable form an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition, and control means for retarding operation of said cushion assembly to effect movement of said second member in the second direction at a speed which is less than the speed of movement of said first member in the second direction during operation of said press assembly toward the open condition and operation of said cushion assembly toward the extended condition, said cushion assembly including means for transmitting force to said second member during operation of said cushion assembly from the retracted condition to the extended condition to move said second member in the second direction, said control means including means for transmitting force to said first member to urge said first member in the second direction during operation of said cushion assembly from the retracted condition to the extended condition.

36. A press assembly as set forth in claim 35 wherein said second member includes surface means for defining an opening extending through said second member, said control means extending through the opening in said second member.

37. A press assembly as set forth in claim 35 wherein said first movable member is an upper draw ring and said second movable member is a lower draw ring, said upper and lower draw rings being disposed in abutting engagement with opposite sides of the workpiece to grip the workpiece during operation of said press assembly toward the closed condition ans deformation of the workpiece.

38. A press assembly as set forth in claim 37 wherein said control means extends through said lower draw ring.

39. A press assembly opeable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition, and control means for retarding operation of said cushion assembly to effect movement of said member in the second direction at a speed which is less than the speed of movement of said first member in the second direction during operation of said press assembly toward the open condition and operation of said cushion assembly toward the extended condition, said control means including a variable volume chamber, means for conducting fluid from said cushion assembly to said variable volume chamber during operation of said cushion assembly from the retracted condition toward the extended condition to effect expansion of said variable volume chamber, and means for retarding expansion of said variable volume chamber against the influence of fluid conducted from said cushion assembly to thereby retard operation of said cushion assembly during operation of said cushion assembly from the retracted condition toward the extended condition.

40. A press assembly as set forth in claim 39 wherein said second member includes surface means for defining an opening extending through said second member, said control means extending through the opening in said second member.

41. A press assembly as set forth in claim 39 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

42. A press assembly as set forth in claim 41 wherein said control means extends through said lower draw ring.

43. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition, and control means for retarding operation of said cushion assembly to effect movement of said second member in the second direction at a speed which is less than the speed of movement of said first member in the second direction during operation of said press assembly toward the open condition and operation of said cushion assembly toward the extended condition, said control means being operable from an extended condition to a retracted condition during operation of said press assembly from the open condition to the closed condition and being operable from the retracted condition to the extended condition during operation of said press assembly from the closed condition to the open condition, said control means being operable at a rate which is greater than the rate of operation of said cushion assembly during at least a portion of operation of said press assembly from the closed condition to the open condition.

44. A press assembly as set forth in claim 43 wherein said second member includes surface means for defining an opening extending through said second member, said control means extending through the opening in said second member.

45. A press assembly as set forth in claim 43 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

46. A press assembly as set forth in claim 45 wherein said control means extends through said lower draw ring.

47. A press assembly operable from an open condition to a closed condition to deform a workpiece, said press assembly including a first movable member for engaging a first side of the workpiece during operation of said press assembly, a second movable member for engaging a second side of the workpiece during operation of said press assembly, said first member being movable toward said second member during operation of said press assembly from the open condition to the closed condition, said first member being movable away from said second member during operation of said press assembly from the closed condition to the open condition, a first cylinder, a first piston disposed in said first cylinder and dividing said first cylinder into first and second variable volume chambers, means for moving said first piston with said first member to increase the size of said first variable volume chamber and decrease the size of said second variable volume chamber during at least a portion of the movement of said first member toward said second member during operation of said press assembly from the open condition to the closed condition said first piston being movable with said first member to decrease the size of said first variable volume chamber and increase the size of said second variable volume chamber during at least a portion of the movement of said first member away from said second member during operation of said press assembly from the closed condition to the open condition, a second cylinder, a second piston disposed in said second cylinder and dividing said second cylinder into third and fourth variable volume chambers, said fourth variable chamber holding a body of gas, said second piston being movable with said second member against the influence of the body of gas in said fourth variable volume chamber to increase the size of said third variable volume chamber and decrease the size of said fourth variable volume chamber during operation of said press assembly from the open condition to the closed condition, said second piston being movable with said second member under the influence of the body of gas in said fourth variable volume chamber to decrease the size of said third variable volume chamber and increase the size of said fourth variable volume chamber during at least a portion of the movement of said second member during operation of said press assembly from the closed condition to the open conditon, conduit means for conducting fluid from said second variable volume chamber to said third variable volume chamber during the decrease in size of said second variable volume chamber to move said second piston to increase the size of said third variable volume chamber and decrease the size of said fourth variable volume chamber during operation of said press assembly from the open condition to the closed condition and for conducting fluid from said third variable volume chamber to said second variable volume chamber during the decrease in size of said third variable volume chamber to move said first piston to increase the size of said second variable volume chamber and decrease the size of said first variable volume chamber during operation of said press assembly from the closed condition to the open condition.

48. A press assembly as set forth in claim 47 wherein said means for moving said first piston with said first member includes means for transmitting force from said first member to said first piston, said second piston being movable with said second member by means for transmitting force between said second member and said second piston.

49. A press assembly as set forth in claim 48 wherein said means for transmitting force from said first member to said first piston extends through said second member.

50. A press assembly as set forth in claim 47 wherein said means for moving said first piston with said first member includes means for transmitting force from said first member to said first piston during operation of said press assembly from the open condition to the closed condition and for transmitting force from said first piston to said first member during operation of said press assembly from the closed condition to the open condition.

51. A press assembly as set forth in claim 47 wherein said second member includes surface means for defining an opening extending through said second member, said means for moving said first piston with said first member extending through the opening in said second member.

52. A press assembly as set forth in claim 47 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

53. A press assembly as set forth in claim 52 wherein said means for moving said first piston with said first member extends through said lower draw ring.

54. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition to a closed condition, said first and second members being movable together in the first direction with at least a portion of the workpiece disposed between said first and second members during continued operation of said press assembly toward the closed condition, and control means for effecting movement of said second member through a first predetermined distance at a speed which is a first function of the speed of movement of said first member prior to movement of said first and second members together and for effecting movement of said second member through a second predetermined distance at a speed which is greater then the speed of movement of said second member through the first predetermined distance and which is a second function of the speed of movement of said first member prior to movement of said first and second members together during operation of said press assembly toward the closed condition.

55. A press assembly as set forth in claim 54 further including a cushion assembly operable toward a retracted condition to provide a yieldable force opposing movement of said second member in the first direction during operation of said press assembly toward the closed condition, said control means including means for effecting operation of said cushion assembly toward the retracted condition at a first rate during movement of said first member through the first distance and for effecting operation of said cushion assembly toward the retracted condition at a second rate during movement of said first member through the second distance.

56. A press assembly as set forth in claim 55 wherein said control means includes means for transmitting force from said first member to said cushion assembly to effect operation of said cushion assembly toward the retracted condition during movement of said first member through the first and second distances.

57. A press assembly as set forth in claim 54 wherein said control means includes force transmitting means for transmitting force from said first member to effect movement of said second member through the first distance at a speed which is a first function of the speed of movement of said first member and for transmitting force from said first member to effect movement of said second member through the second distance at a speed which is a second function of the speed of movement of said first member.

58. A press assembly as set forth in claim 54 wherein said control means is operable to transmit force to said first member urging said first member to move in a second direction opposite to the first direction during operation of said press assembly from the closed condition toward the open condition.

59. A press assembly as set forth in claim 54 wherein said control means is operable to effect movement of said second member through the second predetermined distance at a speed which is the second function of the speed of movement of said first member during one portion of the operation of said press assembly from the closed condition to the open condition and to effect movement of said second member through the first predetermined distance at a speed which is the first function of the speed of movement of said first member during a portion of the operation of said press assembly which occurs after said one portion during operation of said press assembly from the closed condition to the open condition.

60. A press assembly as set forth in claim 54 wherein said control means includes a cylinder, a first piston element disposed in said cylinder and movable relative to said cylinder to effect movement of said second member at the speed which is the first function of the speed of movement of said first member, a second piston element disposed in said cylinder and moveable relative to said cylinder to effect movement of said second member at the speed which is the second function of the speed of movement of said first member.

61. A press assembly as set forth in claim 54 wherein said second member includes surface means for defining an opening extending through said second member, said control means extending through the opening in said second member.

62. A press assembly as set forth in claim 54 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

63. A press assembly as set forth in claim 62 wherein said control means extends through said lower draw ring.

64. A press assembly operable from an open condition to a closed condition to deform a workpiece, said press assembly comprising a first movable member for engaging a first side of the workpiece during operation of said press assembly, said first member being movable from a first position through a first distance in a first direction to a second position during operation of said press assembly from the open condition to the closed condition, a second movable member for engaging a second side of the workpiece, said second member being movable from a third position through a second distance in the first direction to a fourth position during operation of said press assembly from the open condition to the closed condition, said first distance being greater than said second distance, said first and second members being movable at the same speed in the first direction with at least a portion of the workpiece disposed between said first and second members during a portion of the movement of said first and second members in the first direction, said first member being movable from the second position to the first position during operation of said press assembly from the closed condition to the open condition, said second member being movable from the fourth position to the third position during operation of said press assembly from the closed condition to the open condition, and control means for accelerating said second member in the first direction from the third position prior to movement of said first and second members at the same speed during operation of said press assembly from the open condition toward the closed condition, said control means being operable to decelerate said second member before said second member reaches the third position during movement of said second member in the second direction and operation of said press assembly from the open condition toward the closed condition to enable said second member to move to the third position at a speed which is less than the speed at which said first member is moving toward the first position, said control means including means for providing fluid pressure to effect acceleration of said second member in the first direction from the third position and for providing fluid pressure to effect deceleration of said second member before said second member reaches the third position.

65. A press assembly as set forth in claim 64 wherein said second member includes surface means for defining an opening extending through said second member, said control means extending through the opening in said second member.

66. A press assembly as set forth in claim 64 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

67. A press assembly as set forth in claim 66 wherein said control means extends through said lower draw ring.

68. A press assembly operable from an open condition to a closed condition to deform a workpiece, said press assembly comprising a first movable member for engaging a first side of the workpiece during operation of said press assembly, said first member being movable from a first position through a first distance in a first direction to a second position during operation of said press assembly from the open condition to the closed condition, a second movable member for engaging a second side of the workpiece, said second member being movable from a third position through a second distance in the first direction to a fourth position during operation of said press assembly from the open condition to the closed condition, said first distance being greater then said second distance, said first and second members being movable at the same speed in the first direction with at least a portion of the workpiece disposed between said first and second members during a portion of the movement of said first and second members in the first direction, said first member being movable from the second position to the first position during operation of said press assembly from the closed condition to the open condition, said second member being movable from the fourth position to the third position during operation of said press assembly from the closed condition to the open condition, and control means for accelerating said second member in the first direction from the third position prior to movement of said first and second members at the same speed during operation of said press assembly from the open condition toward the closed condition, said control means being operable to decelerate said second member before said second member reaches the third position during movement of said second member in the second direction and operation of said press assembly from the open condition toward the closed condition to enable said second member to move to the third position at a speed which is less than the speed at which said first member is moving toward the first position, said control means including means for providing fluid pressure to effect acceleration of said second member in the first direction from the third position and for providing fluid pressure to effect deceleration of said second member before said second member reaches the third position, said means for providing fluid pressure including a cylinder, a piston disposed in said cylinder to at least partially form a variable volume chamber containing fluid, means for transmitting force between said piston and said first member to provide a fluid pressure to effect acceleration of said second member during operation of said press assembly from the open condition toward the closed condition and to provide a fluid pressure to effect deceleration of said second member during operation of said press assembly from the closed condition towards the open condition.

69. A press assembly as set forth in claim 68 wherein said second member includes surface means for defining an opening extending through said second member, said control means extending through the opening in said second member.

70. A press assembly as set forth in claim 68 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

71. A press assembly as set forth in claim 70 wherein said control means extends through said lower draw ring.

72. A press assembly operable from an open condition to a closed condition to deform a workpiece, said press assembly comprising a first movable member for engaging a first side of the workpiece during operation of said press assembly, said first member being movable from a first position through a first distance in a first direction to a second position during operation of said press assembly from the open condition to the closed condition, a second movable member for engaging a second side of the workpiece, said second member being movable from a third position through a second distance in the first direction to a fourth position during operation of said press assembly from the open condition to the closed condition, said first distance being greater than said second distance, said first and second members being movable at the same speed in the first direction with at least a portion of the workpiece disposed between said first and second members during a portion of the movement of said first and second members in the first direction, said first member being movable from the second position to the first position during operation of said press assembly from the closed condition to the open condition, said second member being movable from the fourth position to the third position during operation of said press assembly from the closed condition to the open condition, control means for accelerating said second member in the first direction from the third position prior to movement of said first and second members at the same speed during operation of said press assembly from the open condition toward the closed condition, said control means being operable to decelerate said second member before said second member reaches the third position during movement of said second member in the second direction and operation of said press assembly from the open condition toward the closed condition to enable said second member to move to the third position at a speed which is less than the speed at which said first member is moving toward the first position, and a cushion assembly operable toward a retracted condition to provide a yieldable force opposing movement of said second member in the first direction toward the fourth position during operation of said press assembly toward the closed condition and operable from the retracted condition toward an extended condition to provide a yieldable force urging said second member in the second direction toward the third position during operation of said press assembly toward the open condition, said control means including means for transmitting force to said cushion assembly to initiate operation of said cushion assembly from the extended condition toward the retracted condition and movement of said second member from the third position during operation of said press assembly toward the closed condition and for transmitting force to said cushion assembly to retard operation of said cushion assembly toward the extended condition and movement of said second member toward the third position during operation of said press assembly toward the open condition, said force transmitting means includes means for transmitting force from said first member to said cushion assembly during operation of said press assembly toward the closed condition and for transmitting force from said cushion assembly to said first member during operation of said press assembly toward the open condition.

73. A press assembly as set forth in claim 72 wherein said second member includes surface means for defining an opening extending through said second member, said control means extending through the opening in said second member.

74. A press assembly as set forth in claim 72 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

75. A press assembly as set forth in claim 74 wherein said control means extends through said lower draw ring.

76. A method of operating a press assembly to deform a workpiece, said method comprising the steps of moving a first member in a first direction toward a second member with the workpiece disposed between the first and second members, transmitting force from the first member as it moves in the first direction, utilizing the force transmitted from the first member to effect acceleration of the second member in the first direction while the first member is spaced from the second member, operating a cushion assembly toward a retracted condition during movement of the second member in the first direction to apply a yieldable force to the second member opposing movement of the second member in the first direction, said step of utilizing force transmitted from the first member to effect acceleration of the second member in the first direction includes transmitting force from the first member to the cushion assembly to initiate operation of the cushion assembly toward the retracted condition, thereafter, gripping the workpiece between the first and second members while the first and second members are moving in the first direction, moving the first and second members in a second direction opposite to the first direction, operating the cushion assembly from the retracted condition toward an extended condition during movement of the first and second members in the second direction, and decelerating the second member relative to the first member during movement of the first and second members in the second direction, said step of decelerating the second member including transmitting force between the cushion assembly and first member to retard operation of the cushiom assembly toward the extended condition.

77. A method as set forth in claim 76 wherein said step of transmitting force from the first member includes transmitting force through an opening in the second member.

78. A method as set forth in claim 76 wherein the first and second members are upper and lower draw rings, said step of gripping the workpiece between the first and second members includes gripping edge portions of the workpiece between the upper and lower draw rings.

79. A method as set forth in claim 78 wherein said step of transmitting force from the first member includes transmitting force from the upper draw ring through an opening in the lower draw ring.

80. A method of operating a press assembly to deform a workpiece, said method comprising the steps of moving a first member in a first direction toward a second member with the workpiece disposed between the first and second members, transmitting force from the first member as it moves in the first direction, utilizing the force transmitted from the first member fo effect acceleration of the second member in the first direction while the first member is spaced from the second member, said step of utilizing the force transmitted from the first member to effect acceleration of the second member in the first direction includes accelerating the second member to a first speed, moving the second member at the first speed, thereafter, accelerating the second member to a second speed which is greater than the first speed, thereafter, gripping the workpiece between the first and second members while the first and second members are moving in the first direction, and moving the second member at the second speed prior to performing said step of gripping the workpiece between the first and second members.

81. A method as set forth in claim 80 wherein said step of gripping the workpiece includes the step of impacting the workpiece and the first member against the second member while the second member is moving at the second speed to accelerate the second member from the second speed to a third speed.

82. A method as set forth in claim 80 wherein said step of transmitting force from the first member includes transmitting force through an opening in the second member.

83. A method as set forth in claim 80 wherein the first and second members are upper and lower draw rings, said step of gripping the workpiece between the first and second members includes gripping edge portions of the workpiece between the upper and lower draw rings.

84. A method as set forth in claim 83 wherein said step of transmitting force from the first member includes transmitting force from the upper draw ring through an opening in the lower draw ring.

85. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed in a second position with at least a portion of the workpiece disposed between the first and second members and moving the first and second members together in a direction away from the second position with at least a portion of the workpiece disposed between the first and second members, said step of operating the press assembly from the closed condition to the open condition including moving the first member toward the first position, moving the second member toward the second position, decelerating the second member, repeating said step of decelerating the second member before the second member reaches the second position, thereafter, moving the second member to the second position, and stopping the second member at the second position while the first member is moving toward the first position.

86. A method as set forth in claim 85 wherein said step of decelerating the second member includes transmitting force to the first member through an opening in the second member.

87. A method as set forth in claim 85 wherein the first and second members are upper and lower draw rings, said method further including the step of gripping the workpiece between the upper and lower draw rings during operation of the press assembly from the open condition to the closed condition.

88. A method as set forth in claim 87 wherein said step of decelerating the second member includes transmitting force to the upper draw ring through an opening in the lower draw ring.

89. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed at a second position with at least a portion of the workpiece disposed between the first and second members, transmitting force from the first member to a cushion assembly to operate the cushion assembly from an extended condition toward a retracted condition and move the second member away from the second position, and, thereafter, impacting the workpiece and the first member against the second member while the second member is moving away from the second position, said step of operating the press assembly from the closed condition to the open condition includes transmitting force from the cushion assembly to the first member.

90. A method as set forth in claim 89 further including the step of applying a yieldable force against the second member with the cushion assembly during movement of the first and second members together after performing said step of impacting the workpiece and first member against the second member.

91. A method as set forth in claim 89 wherein said step of operating the press assembly from the closed condition includes decreasing the speed of movement of the second member relative to the speed of movement of said first member by opposing operation of the cushion assembly toward the extended condition.

92. A method as set forth in claim 89 wherein said step of transmitting force from the first member to the cushion assembly includes transmitting force from the first member to the cushion assembly at a first rate to effect operation of the cushion assembly and movement of the second member away from the second position at a first speed, moving the second member through a predetermined distance at the first speed, thereafter, increasing the rate at which force is transmitted from the first member to the cushion assembly from the first rate to a second rate to effect operation of the cushion assembly and movement of the second member away from the second position at a second speed which is greater than the first speed.

93. A method as set forth in claim 89 further including the step of moving the first member toward the second member at a speed which is greater than said second speed while the second member is moving at the first and second speeds.

94. A method as set forth in claim 89 wherein said step of transmitting force from the first member to a cushion assembly to operate the cushion assembly includes generating a fluid pressure under the influence of force transmitted from the first member and transmitting the generated fluid pressure to the cushion assembly.

95. A method as set forth in claim 89 wherein said step of transmitting force from the first member to the cushion assembly to operate the cushion assembly includes operating the cushion assembly at a first rate, said step of operating the press assembly from the open condition to the closed condition includes the step of transmitting force from the second member to the cushion assembly to operate the cushion assembly at a second rate which is greater than the first rate after performing said step of impacting the workpiece and first member against the second member.

96. A method as set forth in claim 89 wherein said step of transmitting force from the first member includes transmitting force through an opening in the second member.

97. A method as set forth in claim 89 wherein the first and second members are upper and lower draw rings, said step of impacting the workpiece and the first member against the second member includes impacting the workpiece and upper draw ring against the lower draw ring.

98. A method as set forth in claim 97 wherein said step of transmitting force from the first member includes transmitting force from the upper draw ring through an opening in the lowr draw ring.

99. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed at a second position with at least a portion of the workpiece disposed between the first and second members, transmitting force from the first member to a cushion assembly to operate the cushion assembly from an extended condition toward a retracted condition and move the second member away from the second position, said step of transmitting force from the first member to the cushion assembly including transmitting force from the first member to the cushion assembly at a first rate to effect operation of the cushion assembly and movement of the second member away from the second position at a first speed, moving the second member through a predetermined distance at the first speed, thereafter, increasing the rate at which force is transmitted from the first member to the cushion assembly from the first rate to a second rate to effect operation of the cushion assembly and movement of the second member away from the second position at a second speed which is greater than the first speed, and, thereafter, impacting the workpiece and the first member against the second member while the second member is moving away from the second position.

100. A method as set forth in claim 99 further including the step of moving the first member toward the second member at a speed which is greater than said second speed while the second member is moving at the first and second speeds.

101. A method as set forth in claim 99 wherein said step of transmitting force from the first member includes transmitting force through an opening in the second member.

102. A method as set forth in claim 99 wherein the first and second members are upper and lower draw rings, said step of impacting the workpiece and the first member against the second member includes impacting the workpiece and upper draw ring against the lower draw rings.

103. A method as set forth in claim 102 wherein said step of transmitting force from the first member includes transmitting force from the upper draw ring through an opening in the lower draw ring.

104. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed at a second position with at least a portion of the workpiece disposed between the first and second members, moving the second member away from the second position, said step of moving the second member away from the second position including pumping fluid from a control cylinder assembly to a cushion cylinder to assembly to retract the cushion cylinder assembly under the influence of the pumped fluid, and, thereafter, impacting the workpiece and the first member against the second member while the second member is moving away from the second position.

105. A method as set forth in claim 104 further including the step of applying a yieldable force against the second member with the cushion assembly during movement of the first and second members together after performing said step of impacting the workpiece and first member against the second member.

106. A method as set forth in claim 104 wherein said step of pumping fluid from a control cylinder assembly to a cushion cylinder assembly to retract the cushion cylinder assembly includes retracting the control cylinder assembly at a first rate to pump fluid from the control cylinder assembly to the cushion cylinder assembly and retracting the cushion cylinder assembly at a second rate which is less than the first rate under the influence of the fluid pumped from the control cylinder assembly.

107. A method as set forth in claim 104 wherein said step of operating the press assembly from the closed condition to the open condition includes moving the first member toward the first position and moving the second member toward the second position after performance of said step of impacting the workpiece and first member against the second member, said step of moving the second member toward the second position including pumping fluid from the cushion cylinder assembly to the control cylinder assembly to expand the control cylinder assembly under the influence of the pumped fluid.

108. A method as set forth in claim 104 wherein said step of pumping fluid from the control cylinder assembly to the cushion cylinder assembly includes retracting the control cylinder assembly to decrease the size of a chamber in the control cylinder assembly and retracting the cushion cylinder assembly by increasing the size of a chamber in the cushion cylinder assembly under the influence of fluid pumped from the control cylinder assembly.

109. A method as set forth in claim 104 wherein said step of operating the press assembly from the closed condition to the open condition includes moving the first member toward the first position and extending the control cylinder assembly at a first rate and moving the second member toward the second position and extending the cushion cylinder assembly at a second rate which is less than the first rate.

110. A method as set forth in claim 104 wherein said step of pumping fluid from the control cylinder assembly includes transmitting force from the first member to the control cylinder assembly and moving a piston in the control cylinder assembly under the influence of the force transmitted from the first member to force fluid to flow from the control cylinder assembly to the cushion cylinder assembly.

111. A method as set forth in claim 104 wherein said step of pumping fluid from the control cylinder assembly to the cushion cylinder assembly includes moving a piston in the control cylinder assembly at a first speed to contract a cylinder chamber and force fluid from the cylinder chamber to the cushion cylinder assembly to apply fluid pressure force against a piston in the cushion cylinder assembly to move the piston in the cushion cylinder assembly at a second speed which is less than the first speed to expand a cylinder chamber in the cushion cylinder assembly.

112. A method as set forth in claim 104 wherein said step of pumping fluid includes transmitting force through an opening in the second member.

113. A method as set forth in claim 104 wherein the first and second members are upper and lower draw rings, said step of impacting the workpiece and first member against the second member includes gripping edge portions of the workpiece between the upper and lower draw rings.

114. A method as set forth in claim 113 wherein said step of pumping fluid includes transmitting force from the upper draw ring through an opening in the lower draw ring.

115. A press assembly operable from an open condition to a closed condition to deform a workpiece, said press assembly including a first movable member for engaging a first side of the workpiece during operation of said press assembly, a second movable member for engaging a second side of the workpiece during operation of said press assembly, said first member being movable toward said second member during operation of said press assembly from the open condition to the closed condition, said first member being movable away from said second member during operation of said press assembly from the closed condition to the open condition, a first cylinder, a first piston disposed in said first cylinder, means for moving said first piston to force fluid from said first cylinder during operation of said press assembly from the open condition to the closed condition, said first piston being movable to enable fluid to flow into said first cylinder during operation of said press assembly from the closed condition to the open condition, a second cylinder, a second piston disposed in said second cylinder, means for moving said second piston to force fluid from said second cylinder during operation of said press assembly from the closed condition to the open condition, said second piston being movable to enable fluid to flow into said second cylinder during operation of said press assembly from the open condition to the closed condition, conduit means for conducting fluid from said first cylinder to said second cylinder during operation of said press assembly from the open condition to the closed condition and for conducting fluid from said second cylinder to said first cylinder during operation of said press assembly from the closed condition to the open condition.

116. A press assembly as set forth in claim 115 wherein said means for moving said first piston includes means for transmitting force from said first member to said first piston during operation of said press assembly from the open condition to the closed condition, said second member being movable with said second piston during operation of said press assembly from the open condition to the closed condition.

117. A press assembly as set forth in claim 116 wherein said means for transmitting force from said first member to said first piston extends through said second member.

118. A press assembly as set forth in claim 115 wherein said means for moving said first piston includes means for transmitting force from said first member to said first piston during operation of said press assembly from the open condition to the closed condition and for transmitting force from said first piston to said first member during operation of said press assembly from the closed condition to the open condition.

119. A press assembly as set forth in claim 115 wherein said means for moving said second piston during operation of said press assembly from the closed condition to the open condition includes means for applying fluid pressure against said second piston.

120. A press assembly as set forth in claim 115 wherein said second member includes surface means for defining an opening extending through said second member, said means for moving said first piston extending through the opening in said second member.

121. A press assembly as set forth in claim 115 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

122. A press assembly as set forth in claim 121 wherein said means for moving said first piston extends through said lower draw ring.

123. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said means for pumping fluid from said control means to said cushion assembly during operation of said press assembly from the open condition toward the closed condition being operable to transmit force from said cushion assembly to said first member during operation of said press assembly from the closed condition toward the open condition.

124. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said first and second members being movable together in a second direction opposite to the first direction during operation of said press assembly from the closed condition to the open condition, said cushion assembly including means for pumping fluid from said cushion assembly to said control means during operation of said press assembly from the closed condition to the open condition, said control means including means for retarding fluid flow from said cushion assembly during movement of said first and second members together in the second direction to effect movement of said second member in the second direction at a speed which is less than the speed of movement of said first member in the second direction during operation of said press assembly from the closed condition to the open condition.

125. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said means for pumping fluid from said control means to said cushion assembly during operation of said press assembly from the open condition toward the closed condition includes means for pumping fluid at a first rate to effect movement of said second member in the first direction at a first speed during a first portion of the movement of said second member prior to movement of said first and second members together and means for pumping fluid at a second rate which is greater than the first rate to effect movement of said second member in the first direction at a second speed which is greater than said first speed during a second portion of the movement of said second member prior to movement of said first and second members together.

126. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said first and second members being movable in a second direction opposite to the first direction during operation of said press assembly from the closed condition to the open condition, said cushion assembly including means for pumping fluid to said control means at a first rate to effect movement of said second member in the second direction at a first speed during a first portion of the movement of said second member in the second direction and while said first member is moving in the second direction at a speed which is greater than the first speed and for pumping fluid to said control means at a second rate which is less than the first rate to effect movement of said second member in the second direction at a second speed which is less than the first speed during a second portion of the movement of said second member in the second direction and while said first member is moving in the second direction at a speed which is greater than the second speed.

127. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said means for pumping fluid from said control means to said cushion assembly during operation of said press assembly from the open condition toward the closed condition includes means for generating fluid pressure under the influence of force transmitted from said first member and conduit means for conducting fluid flow induced by the generated fluid pressure to said cushion assembly during operation of said press assembly from the open condition to the closed condition.

128. A press assembly as set forth in claim 127 wherein said means for pumping fluid from said control means to said cushion assembly during operation of said press assembly from the open condition toward the closed condition includes means for retarding operation of said cushion assembly from the retracted condition during operation of said press assembly from the closed condition to the open condition by retarding fluid flow from said cushion assembly.

129. A press assembly as set forth in claim 127 wherein said cushion assembly includes wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said means for pumping fluid from said control means to said cushion assembly including means for increasing the hydraulic fluid pressure in said second variable volume chamber to move said piston to increase the volume of said second variable volume chamber and decrease the volume of said first variable volume chamber.

130. A press assembly as set forth in claim 127 wherein said second member includes surface means for defining an opening extending through said second member, said means for pumping fluid extending through the opening in said second member to transmit force from said first member through said second member to said means for generating fluid pressure.

131. A press assembly as set forth in claim 127 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

132. A press assembly as set forth in claim 131 wherein said means for pumping fluid extends through said lower draw ring.

133. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said means for pumping fluid from said control means to said cushion assembly during operation of said press assembly from the open condition toward the closed condition includes means for retarding operation of said cushion assembly from the retracted condition during operation of said press assembly from the closed condition to the open condition by retarding fluid flow from said cushion assembly.

134. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said cushion assembly including wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said means for pumping fluid from said control means to said cushion assembly including means for increasing the hydraulic fluid pressure in said second variable volume chamber to move said piston to increase the volume of said second variable volume chamber and decrease the volume of said first variable volume chamber.

135. A press assembly as set forth in claim 134 wherein said means for pumping fluid from said control means to said cushion assembly during operation of said press assembly from the open condition toward the closed condition is operable to transmit force from said cushion assembly to said first member during operation of said press assembly from the closed condition toward the open condition.

136. A press assembly as set forth in claim 134 wherein said first and second members are movable together in a second direction opposite to the first direction during operation of said press assembly from the closed condition to the open condition, said piston in said cushion assembly being movable under the influence of the fluid pressure first variable volume chamber to pump hydraulic fluid from said second variable volume chamber to said control means during operation of said press assembly from the closed condition to the open condition, said control means including means for retarding fluid flow from said cushion assembly during movement of said first and second members together in the second direction to effect movement of said second member in the second direction at a speed which is less than the speed of movement of said first member in the second direction during operation of said press assembly from the closed condition to the open condition.

137. A press assembly as set forth in claim 134 wherein said means for pumping fluid from said control means to said cushion assembly during operation of said press assembly from the open condition toward the closed condition includes means for generating fluid pressure under the influence of force transmitted from said first member and conduit means for conducting fluid flow induced by the generated fluid pressure to said cushion assembly during operation of said press assembly from the open condition to the closed condition.

138. A press assembly as set forth in claim 134 wherein said means for pumping fluid from said control means to said cushion assembly during operation of said press assembly from the open condition toward the closed condition includes means for retarding operation of said cushion assembly from the retracted condition during operation of said press assembly from the closed condition to the open condition by retarding fluid flow from said cushion assembly.

139. A press assembly as set forth in claim 134 wherein said second member includes surface means for defining an opening extending through said second member, said means for pumping fluid extending through the opening in said second member to transmit force from said first member through said second member.

140. A press assembly as set forth in claim 134 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

141. A press assembly as set forth in claim 140 wherein said means for pumping fluid extends through said lower draw ring.

142. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said means for pumping fluid from said control means to said cushion assembly during operation of said press assembly from the open condition toward the closed condition includes wall means for defining a cylinder chamber, a piston disposed in said cylinder chamber, means for transmitting force from said first member to said piston to pressurize fluid in said cylinder chamber, and means for conducting fluid pressure from said cylinder chamber to said cushion assembly, said cushion assembly including means for effecting operation of said cushion assembly toward the retracted condition under the influence of fluid pressure conducted from said cylinder chamber.

143. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said cushion assembly includes a first piston and cylinder assembly and means for transmitting force from said second member to said first piston and cylinder assembly to effect operation of said cushion assembly toward the retracted condition during operation of said press assembly from the open condition toward the closed condition, said means for pumping fluid from said control means to said cushion assembly during operation of said press assembly from the open condition toward the closed condition including a second piston and cylinder assembly, means for transmitting force from said first member to said second piston and cylinder assembly, and means for transmitting fluid pressure from said second piston and cylinder assembly to said first piston and cylinder assembly to effect operation of said first piston and cylinder assembly under the influence of fluid pressure transmitted from said second piston and cylinder assembly.

144. A press assembly as set forth in claim 143 wherein said second piston and cylinder assembly includes a cylinder, a first piston element disposed in said cylinder, and a second piston element disposed in said cylinder, said first piston element being movable relative to said second piston element and said cylinder to effect operation of said first piston and cylinder assembly at a first rate, said first and second piston elements being movable together relative to said cylinder to effect operation of said first piston and cylinder assembly at a second rate which is greater than said first rate.

145. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second directon opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said cushion assembly being operable toward the extended condition at a first speed to pump fluid from said cushion assembly at a first rate during a first portion of the movement of said first and second members in the second direction, said control means including means for reducing the speed of operation of said cushion assembly from the first speed to a second speed which is less than the first speed during a second portion of the movement of said first and second members in the second direction by reducing the rate at which fluid is pumped from said cushion assembly from the first rate to a second rate which is less than the first rate.

146. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second directon during operation of said press assembly toward the open condition and operation of said cushion assembly toward the extended condition, said control means being ineffective to retard operation of said cushion assembly during an initial portion of the operation of said cushion assembly from the retracted condition toward the extended condition to enable said first and second members to move at the same speed in the same direction, said control means being effective to retard operation of said cushion assembly during a second portion of the operation of said cushion assembly from the retracted condition toward the extended condition to effect movement of said second member in the second direction at a second speed which is less than the first speed and which is less than the speed of movement of said first member in the second direction during the second portion of the operation of said cushion assembly, said control means being effective to further retard operation of said cushion assembly during a third portion of the operation of said cushion assembly from the retracted condition toward the extended condition to effect movement of said second member in the second direction at a third speed which is less than the speed during the third portion of the operation of said cushion assembly.

147. A press assembly as set forth in claim 146 wherein said control means includes a cylinder, a first piston element disposed in said cylinder and a second piston element disposed in said cylinder, said first and second piston elements being movable together relative to said cylinder during the second portion of the operation of said cushion assembly from the retracted condition toward the extended condition, said first piston element being movable relative to said second piston element and said cylinder during the third portion of the operation of said cushion assembly from the retracted condition toward the extended condition.

148. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said cushion assembly including means for transmitting force to said second member during operation of said cushion assembly from the retracted condition to the extended condition to move said second member in the second direction, said control means including means for transmitting force to said first member to urge said first member in the second direction during operation of said cushion assembly from the retracted condition to the extended condition.

149. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said control means includes a variable volume chamber, means for conducting fluid flow pumped from said cushion assembly to said variable volume chamber during operation of said cushion assembly from the retracted condition toward the extended condition to effect expansion of said variable volume of chamber, and means for retarding expansion of said variable volume chamber against the influence of the fluid conducted from said cushion assembly to thereby retard operation of said cushion assembly during operation of said cushion assembly from the retracted condition toward the extended condition.

150. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly torward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said control means being operable from an extended condition to a retracted condition to pump fluid to said cushion assembly during operation of said press assembly from the open condition to the closed condition and is operable from the retracted condition to the extended condition during operation of said press assembly from the closed condition to the open condition to receive fluid flow pumped from said cushion assembly.

151. A method comprising the steps of operating a press assembly from an open condition to a closed condition to deform a workpiece and operating the press assembly from the closed condition to the open condition to facilitate removal of the deformed workpiece from the press assembly, said step of operating the press assembly from an open condition to a closed condition including moving a first member from a first position toward a second member disposed in a second position with at least a portion of the workpiece disposed between the first and second members and moving the first and second mambers together in a direction away from the second position with at least a portion of the workpiece disposed between the first and second members, said step of operating the press assembly from the closed condition to the open condition including moving the first member toward the first position, moving the second member toward the second position, said step of moving the second member toward the second position including pumping fluid from a cushion assembly to a control assembly, decelerating the second member, said step of decelerating the second member including limiting the rate at which fluid is pumped from the cushion assembly to the control assembly, thereafter, moving the second member to the second position, and stopping the second member at the second position while the first member is moving toward the first position.

152. A method as set forth in claim 151 wherein said step of operating the press assembly from the open condition to the closed condition includes transmitting force from the first member to the control assembly to pump fluid from the control assembly to the cushion assembly as the first member moves in the first direction and utilizing the fluid pumped from the control assembly to effect acceleration of the second member from the second position while the first member is spaced from the second member, said step of moving the first and second members together in a direction away from the second position being performed after accelerating the second member from the second position.

153. A method as set forth in claim 151 wherein said step of decelerating the second member includes the step of transmitting force from the control assembly to the first member to urge the first member toward the first position and to reduce the rate at which fluid can be pumped from said cushion assembly to said control assembly.

154. A method as set forth in claim 151 wherein said step of limiting the rate at which fluid is pumped from the cushion assembly includes transmitting force through an opening in the second member.

155. A method as set forth in claim 151 wherein the first and second members are upper and lower draw rings, said step of moving said first and second members together away from the second position includes gripping edge portions of the workpiece between the upper and lower draw rings.

156. A method as set forth in claim 155 wherein said step of limiting the rate at which fluid is pumped from the cushion assembly includes transmitting force from the upper draw ring through an opening in the lower draw ring.

157. A method of operating a press assembly to deform a workpiece, said method comprising the steps of moving a first member in a first direction toward a second member with the workpiece disposed between the first and second members, transmitting force from the first member as it moves in the first direction, utiliting the force transmitted from the first member to effect acceleration of the second member in the first direction while the first member is spaced from the second member, thereafter, gripping the workpiece between the first and second members while the first and second members are moving in the first direction, thereafter, moving the first and second members in a second direction opposite to the first direction, and reducing the speed of the second member relative to the speed of the first member during movement of the first and second members in the second direction, said step of reducing the speed of the second member including transmitting force to the first member urging the first member in the second direction.

158. A method as set forth in claim 157 wherein said step of gripping the workpiece between the first and second members includes the step of impacting the workpiece and first member against the second member to effect further acceleration of the second member in the first direction after performing said step of utilizing the force transmitted from the fist member to effect acceleration of the second member.

159. A method as set forth in claim 157 further including the step of operating a cushion assembly toward a retracted condition during movement of the second member in the first direction to apply a yieldable force to the second member opposing movement of the second member in the first direction, said step of utilizing force transmitted from the first member to effect acceleration of the second member in the first direction includes transmitting force from the first member to the cushion assembly to initiate operation of the cushion assembly toward the retracted condition.

160. A method as set forth in claim 157 wherein said step of utilizing the force transmitted from the first member to effect acceleration of the second member in the first direction includes accelerating the second member to a first speed and moving the second member at the first speed, said step of gripping the workpiece including the step of impacting the workpiece and the first member against the second member while the second member is moving at the first speed to accelerate the second member from the first speed to a second speed.

161. A method as set forth in claim 157 wherein said steps of transmitting force from the first member and utilizing the force to effect acceleration of the second member includes generating fluid pressure under the influence of force transmitted from the first member and utilizing the generated fluid pressure to effect movement of the second member in the first direction.

162. A method as set forth in claim 157 wherein said step of transmitting force from the first member includes transmitting force through an opening in the second member.

163. A method as set forth in claim 157 wherein the first and second members are upper and lower draw rings, said step of gripping the workpiece between the first and second members includes gripping edge portions of the workpiece between the upper and lower draw rings.

164. A method as set forth in claim 163 wherein said step of transmitting force from the first member includes transmitting force from the upper draw ring through an opening in the lower draw ring.

165. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said second member includes surface means for defining an opening extending through said second member, said means for pumping fluid extending through the opening in said second member to transmit force from said first member through said second member.

166. A press assembly as set forth in claim 165 wherein said means for pumping fluid from said control means to said cushion assembly during operation of said press assembly from the open condition toward the closed condition is operable to transmit force from said cushion assembly through the opening in said second member to said first member during operation of said press assembly from the closed condition toward the open condition.

167. A press assembly as set forth in claim 165 wherein said first and second members are movable together in a second direction opposite to the first direction during operation of said press assembly from the closed condition to the open condition, said cushion assembly including means for pumping fluid from said cushion assembly to said control means during operation of said press assembly from the closed condition to the open condition, said control means including means for retarding fluid flow from said cushion assembly during movement of said first and second members together in the second direction to effect movement of said second member in the second direction at a speed which is less than the speed of movement of said first member in the second direction during operation of said press assembly from the closed condition to the open condition, said means for retarding fluid flow from said cushion assembly being operable to transmit force through the opening in said second member to said first member during operation of said press assembly from the closed condition to the open condition.

168. A press assembly as set forth in claim 165 wherein said means for pumping fluid from said control means to said cushion assembly during operation of said press assembly from the open condition toward the closed condition includes means for pumping fluid at a first rate to effect movement of said second member in the first direction at a first speed during a first portion of the movement of said second member prior to movement of said first and second members together and under the influence of force transmitted from said first member through the opening in said second member and means for pumping fluid at a second rate which is greater than the first rate to effect movement of said second member in the first direction at a second speed which is greater than said first speed during a second portion of the movement of said second member prior to movement of said first and second members together and under the influence of force transmitted from said first member through the opening in said second member.

169. A press assembly as set forth in claim 165 wherein said first and second members are movable in a second direction opposite to the first direction during operation of said press assembly from the closed condition to the open condition, said cushion assembly including means for pumping fluid to said control means at a first rate to effect movement of said second member in the second direction at a first speed during a first portion of the movement of said second member in the second direction and for pumping fluid to said control means at a second rate which is less than the first rate to effect movement of said second member in the second direction at a second speed which is less than the first speed during a second portion of the movement of said second member in the second direction.

170. A press assembly as set forth in claim 165 wherein said means for pumping fluid from said control means to said cushion assembly during operation of said press assembly from the open condition toward the closed condition includes means for generating fluid pressure under the influence of force transmitted from said first member through the opening in said second member and conduit means for conducting fluid flow induced by the generated fluid pressure to said cushion assembly during operation of said press assembly from the open condition toward the closed condition.

171. A press assembly as set forth in claim 165 wherein said means for pumping fluid from said control means to said cushion assembly during operation of said press assembly from the open condition toward the closed condition includes means for transmitting force through the opening in said second member to said first member to retard operation of said cushion assembly from the retracted condition during operation of said press assembly from the closed condition to the open condition by retarding fluid flow from said cushion assembly.

172. A press assembly as set forth in claim 165 wherein said means for pumping fluid from said control means to said cushion assembly during operation of said press assembly from the open condition toward the closed condition includes wall means for defining a cylinder chamber, a piston disposed in said cylinder chamber, means for transmitting force from said first member through the opening in said second member to said piston to pressurize fluid in said cylinder chamber, and means for conducting fluid pressure from said cylinder chamber to said cushion assembly, said cushion assembly including means for effecting operation of said cushion assembly toward the retracted condition under the influence of fluid pressure conducted from said cylinder chamber.

173. A press assembly as set forth in claim 165 wherein said cushion assembly includes a first piston and cylinder assembly and means for transmitting force from said second member to said first piston and cylinder assembly to effect operation of said cushion assembly toward the retracted condition during operation of said press assembly from the open condition toward the closed condition, said means for pumping fluid from said control means to said cushion assembly during operation of said press assembly from the open condition toward the closed condition including a second piston and cylinder assembly, means for transmitting force from said first member through the opening in said second member to said second piston and cylinder assembly, and means for transmitting fluid pressure from said second piston and cylinder assembly to said first piston and cylinder assembly to effect operation of said first piston and cylinder assembly under the influence of fluid pressure transmitted from said second piston and cylinder assembly.

174. A press assembly as set forth in claim 173 wherein said second piston and cylinder assembly includes a cylinder, a first piston element disposed in said cylinder, and a second piston element disposed in said cylinder, said first piston element being movable relative to said second piston element and said cylinder to effect operation of said first piston and cylinder assembly at a first rate, said first and second piston elements being movable together relative to said cylinder to effect operation of said first piston and cylinder assembly at a second rate which is greater than said first rate.

175. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means for pumping fluid from said control means to said cushion assembly to initiate operation of said cushion assembly toward the retracted condition prior to movement of said first and second members together in the first direction during operation of said press assembly from the open condition toward the closed condition, said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece, said means for pumping fluid extending through said lower draw ring.

176. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said second member includes surface means for defining an opening extending through said second member, said control means extending through the opening in said second member to transmit force to said first member.

177. A press assembly as set forth in claim 176 wherein said cushion assembly is operable toward the extended condition at a first speed to pump fluid from said cushion assembly at a first rate during a first portion of the movement of said first and second members in the second direction, said control means including means for reducing the speed of operation of said cushion assembly from the first speed to a second speed which is less than the first speed during a second portion of the movement of said first and second members in the second direction by reducing the rate at which fluid is pumped from said cushion assembly from the first rate to a second rate which is less than the first rate.

178. A press assembly as set forth in claim 176 wherein said control means is ineffective to retard operation of said cushion assembly during an initial portion of the operation of said cushion assembly from the retracted condition toward the extended condition to enable said first and second members to move at the same speed in the second direction, said control means being effective to retard operation of said cushion assembly during a second portion of the operation of said cushion assembly from the retracted condition toward the extended condition to effect movement of said second member in the second direction at a second speed which is less than the first speed and which is less than the speed of movement of said first member in the second direction during the second portion of the operation of said cushion assembly.

179. A press assembly as set forth in claim 178 wherein said control means is effective to further retard operation of said cushion assembly during a third portion of the operation of said cushion assembly from the retracted condition toward the extended condition to effect movement of said second member in the second direction at a third speed which is less than the second speed during the third portion of the operation of said cushion assembly.

180. A press assembly as set forth in claim 179 wherein said control means includes a cylinder, a first piston element disposed in said cylinder and a second piston element disposed in said cylinder, said first and second piston elements being movable together relative to said cylinder during the second portion of the operation of said cushion assembly from the retracted condition toward the extended condition, said first piston element being movable relative to said second piston element and said cylinder during the third portion of the operation of said cushion assembly from the retracted condition toward the extended condition.

181. A press assembly as set forth in claim 176 wherein said cushion assembly includes means for transmitting force to said second member during operation of said cushion assembly from the retracted condition to the extended condition to move said second member in the second direction, said control means including means for transmitting force through the opening in said second member to said first member to urge said first member in the second direction during operation of said cushion assembly from the retracted condition to the extended condition.

182. A press assembly as set forth in claim 176 wherein said control means includes a variable volume chamber, means for conducting fluid flow pumped from said cushion assembly to said variable volume chamber during operation of said cushion assembly from the retracted condition toward the extended condition to effect expansion of said variable volume of chamber, and means for retarding expansion of said variable volume chamber against the influence of the fluid conducted from said cushion assembly to thereby retard operation of said cushion assembly during operation of said cushion assembly from the retracted condition toward the extended condition.

183. A press assembly as set forth in claim 176 wherein said control means is operable from an extended condition to a retracted condition to pump fluid to said cushion assembly during operation of said press assembly from the open condition to the closed condition and is operable from the retracted condition to the extended condition during operation of said press assembly from the closed condition to the open condition to receive fluid flow pumped from said cushion assembly.

184. A press assembly operable from an open condition to a closed condition to deform a workpiece, said press assembly comprising a first movable member for engaging a first side of the workpiece, a second movable member for engaging a second side of the workpiece, said first and second members being movable in a first direction with at least a portion of the workpiece disposed between said first and second members during operation of said press assembly toward the closed condition, a cushion assembly operable toward a retracted condition to provide a yieldable force opposing movement of said second member in the first direction during operation of the press assembly toward the closed condition, said first and second members being movable in a second direction opposite to the first direction during operation of said press assembly toward the open condition, said cushion assembly being operable from the retracted condition toward an extended condition during operation of said press assembly toward the open condition to pump fluid from said cushion assembly, and control means for retarding fluid flow from said cushion assembly to effect movement of said second member in the second direction at a speed which is less than the speed of movement of said first member in the second direction during operation of said press assembly toward the open condition and operation of said cushion assembly toward the extended condition, said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece, said control means extends through said lower draw ring.

185. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition is operable to transmit force from said cushion assembly through the opening in said second member to said first member during operation of said press assembly from the closed condition toward the open condition.

186. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said first and second members being movable together in a second direction opposite to the first direction during operation of said press assembly from the closed condition to the open condition, said means for transmitting force being operable to transmit force through the opening in said second member to said first member to oppose operation of said cushion assembly during movement of said first and second members together in the second direction to decrease the speed of movement of said second member in the second direction to a speed which is less than the speed of movement of said first member in the second direction during operation of said press assembly from the closed condition to the open condition.

187. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition includes means for generating a fluid pressure under the influence of force transmitted from said first member through the opening in said second member and conduit means for conducting the generated fluid pressure from said means for generating fluid pressure to said cushion assembly during operation of said press assembly from the open condition to the closed condition.

188. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition includes means for retarding operation of said cushion assembly from the retracted condition during operation of said press assembly from the closed condition to the open condition under the influence of force transmitted through the opening in said second member.

189. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said cushion assembly includes wall means for defining a cylinder chamber, a piston disposed in said cylinder chamber and dividing said cylinder chamber into first and second variable volume chambers, said first variable volume chamber containing a gas, said second variable volume chamber containing hydraulic fluid, said means for transmitting force from said first member to said cushion assembly including means for increasing the hydraulic fluid pressure in said second variable volume chamber under the influence of force transmitted through the opening in said second member to move said piston to increase the volume of said second variable volume chamber and decrease the volume of said first variable volume chamber.

190. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said means for transmitting force from said first member to said cushion assembly during operation of said press assembly from the open condition toward the closed condition includes wall means for defining a cylinder chamber, a piston disposed in said cylinder chamber, means for transmitting force from said first member through the opening in said second member to said piston to pressurize fluid in said cylinder chamber, and means for conducting fluid pressure from said cylinder chamber to said cushion assembly, said cushion assembly including means for effecting operation of said cushion assembly toward the retracted condition under the influence of fluid pressure conducted from said cylinder chamber.

191. A press assembly operable from an open condition to a closed condition to deform a workpiece, said press assembly comprising a first movable member for engaging a first side of the workpiece, a second movable member for engaging a second side of the workpiece, said second movable member including surface means for defining an opening extending through said second movable member, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, and control means for initiating movement of said second member in the first direction prior to movement of said first and second members together in the first direction during operation of said press assembly from the open condition toward the closed condition, said control means including means extending through the opening in said second member for transmitting force from said first member to said cushion assembly to initiate operation of said cushion assembly toward the retracted condition prior to movement of said first and second members together in the first direction during operation of said press assembly from the open condition toward the closed condition, said cushion assembly includes a first piston and cylinder assembly and means for transmitting force from said second member to said first piston and cylinder assembly to effect operation of said cushion assembly toward the retracted condition during operation of said press assembly from the open condition toward the closed condition, said means for transmitting force from said first member to said cushion assembly during operation of said press assembly from the open condition toward the closed condition including a second piston and cylinder assembly, means for transmitting force from said first member through the opening in said second member to said second piston and cylinder assembly, and means for transmitting fluid pressure from said second piston and cylinder assembly to said first piston and cylinder assembly to effect operation of said first piston and cylinder assembly under the influence of fluid pressure transmitted from said second piston and cylinder assembly.

192. A press assembly as set forth in claim 191 wherein said second piston and cylinder assembly includes a cylinder, a first piston element disposed in said cylinder, a second piston element disposed in said cylinder, said first piston element being movable relative to said second piston element and said cylinder to effect operation of said first piston and cylinder assembly at a first rate, said first and second piston elements being movable together relative to said cylinder to effect operation of said first piston and cylinder assembly at a second rate which is greater than said first rate.

193. A press assembly as set forth in claim 191 wherein said first movable member is an upper draw ring and said second movable member is a lower draw ring, said upper and lower draw rings being disposed in abutting engagement with opposite sides of the workpiece to grip the workpiece during operation of said press assembly toward the closed condition and deformation of the workpiece.

* * * * *

UNITED STATES PATENT AND TRADEMARK OFFICE
CERTIFICATE OF CORRECTION

PATENT NO. : 5,003,807

DATED : April 2, 1991

INVENTOR(S) : John Terrell, Paul M. Kadis, Leonard L. Hiney, and Susan E. Pfaff It is certified that error appears in the above-identified patent and that said Letters Patent is hereby corrected as shown below:

Column 23, Line 8, Claim 26, change "elememts" to --elements--.

Column 24, Line 38, Claim 35, change "form" to --from--.

Column 33, Line 22, Claim 76, change "cushiom" to --cushion--.

Column 35, Line 61, Claim 98, change "lowr" to --lower--.

Column 47, Line 40, Claim 146, change "same" to --second--.

Column 47, Line 54, Claim 146, after "the" insert --second--.

Column 48, Line 47, Claim 149, after "force" insert --opposing--.

Column 49, Line 54, Claim 151, change "mambers" to --members--.

Column 50, Line 64, Claim 158, change "fist" to --first--.

Signed and Sealed this

Eighth Day of September, 1992

Attest:

DOUGLAS B. COMER

Attesting Officer

Acting Commissioner of Patents and Trademarks